US011109029B2

(12) United States Patent
Li et al.

(10) Patent No.: US 11,109,029 B2
(45) Date of Patent: Aug. 31, 2021

(54) VIDEO ENHANCEMENT METHOD AND DEVICE

(71) Applicant: Tencent Technology (Shenzhen) Company Limited, Shenzhen (CN)

(72) Inventors: Kai Li, Shenzhen (CN); Pulin Wang, Shenzhen (CN); Xiaocui Ji, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/459,846

(22) Filed: Jul. 2, 2019

(65) Prior Publication Data

US 2019/0327470 A1    Oct. 24, 2019

Related U.S. Application Data

(63) Continuation of application No. 15/409,186, filed as application No. PCT/CN2015/088437 on Aug. 28, 2015, now Pat. No. 10,390,014.

(30) Foreign Application Priority Data

Aug. 14, 2014  (CN) .......................... 201410401578.8

(51) Int. Cl.
*H04N 19/124* (2014.01)
*H04N 19/137* (2014.01)
(Continued)

(52) U.S. Cl.
CPC ......... *H04N 19/124* (2014.11); *H04N 19/137* (2014.11); *H04N 19/142* (2014.11); *H04N 19/172* (2014.11); *H04N 19/186* (2014.11)

(58) Field of Classification Search
None
See application file for complete search history.

(56) References Cited

U.S. PATENT DOCUMENTS

| 8,224,106 B2 | 7/2012 | Bing et al. |
| 2009/0086814 A1* | 4/2009 | Leontaris ............... H04N 19/17 375/240.02 |

(Continued)

FOREIGN PATENT DOCUMENTS

| CN | 101340510 A | 1/2009 |
| CN | 101340511 A | 1/2009 |

(Continued)

OTHER PUBLICATIONS

International Search Report of PCT/CN2015/088437, dated Dec. 3, 2015.

*Primary Examiner* — Samuel D Fereja
(74) *Attorney, Agent, or Firm* — Jeffri A. Kaminski; Venable LLP

(57) ABSTRACT

The disclosure discloses a video enhancement method and device, and belongs to the field of image processing. The method includes that: each frame in a video is sequentially acquired; and for each current frame, attribute information reflecting a moving state or luminance is determined, a preset mapping relationship is searched to obtain a control parameter corresponding to the attribute information, and video enhancement operation is executed on the current frame by using the control parameter. The device includes: an acquisition module and an enhancement module. By the disclosure, the problem of processing inflexibility caused by execution of the same enhancement over each frame in the video is solved, each frame in the video may be differentially enhanced, frame-based video enhancement is implemented, (Continued)

a video enhancement effect is effectively improved, and quality of the video is improved.

16 Claims, 13 Drawing Sheets

(51) Int. Cl.
*H04N 19/142* (2014.01)
*H04N 19/172* (2014.01)
*H04N 19/186* (2014.01)

(56) References Cited

U.S. PATENT DOCUMENTS

| | | | | |
|---|---|---|---|---|
| 2011/0255589 | A1* | 10/2011 | Saunders | H04N 19/122 |
| | | | | 375/240.01 |
| 2014/0321534 | A1* | 10/2014 | Su | H04N 19/136 |
| | | | | 375/240.03 |
| 2015/0043655 | A1* | 2/2015 | Nilsson | H04N 5/91 |
| | | | | 375/240.26 |

FOREIGN PATENT DOCUMENTS

| | | |
|---|---|---|
| CN | 101345820 A | 1/2009 |
| CN | 103440637 A | 12/2013 |
| CN | 103973941 A | 8/2014 |
| CN | 104202604 A | 12/2014 |
| WO | 2013153935 A1 | 10/2013 |

* cited by examiner

| A($\alpha$ 1=2) | B($\alpha$ 1=2) | C($\alpha$ 1=6) |
| D($\alpha$ 1=0) | O($\alpha$ 1'=4 或 $\alpha$ 1'=3) | |
Fig. 22
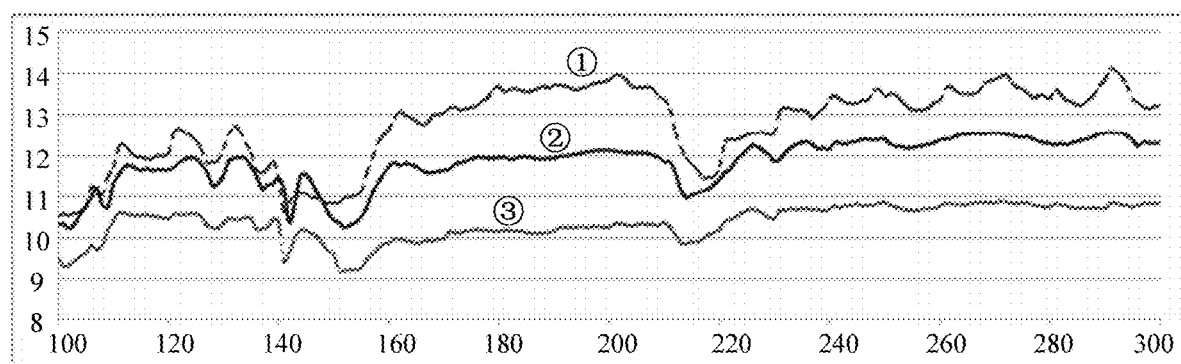
Fig. 23
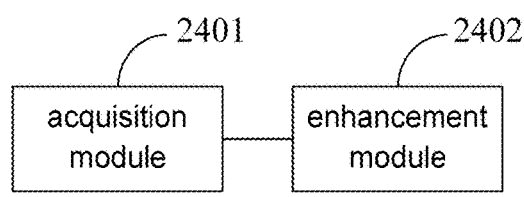
Fig. 24

VIDEO ENHANCEMENT METHOD AND DEVICE

PRIORITY CLAIM AND RELATED APPLICATIONS

This application is a continuation of co-pending U.S. patent application Ser. No. 15/409,186, entitled "VIDEO ENHANCEMENT METHOD AND DEVICE," filed on Jan. 18, 2017, which is a continuation application of PCT/CN2015/088437, filed Aug. 28, 2015 and published on Feb. 18, 2016 as WO/2016/023526, which claims the benefit of Chinese Patent Application No. 201410401578.8, filed Aug. 14, 2014, all of which are hereby incorporated by reference in their entireties.

TECHNICAL FIELD

The disclosure relates to the field of image processing, and in particular to a video enhancement method and device.

BACKGROUND

If a video is damaged to a certain extent and polluted by various kinds of noise in a transmission and storage process, the video may lose its essence or be deviated from a requirement of a user. Therefore, video pre-processing becomes an essential means for eliminating bad influence.

A video pre-processing technology refers to a series of operation executed before processing of a video, including image enhancement, image restoration and the like, wherein image enhancement is to add some information or transform data to an original image by virtue of a certain means, and selectively highlight an interested characteristic in the image or suppress some unnecessary characteristics in the image to match the image with a visual response characteristic, thereby improving quality of the image and enhancing a visual effect.

According to different spaces where an enhancement processing process is executed, image enhancement may be divided into two categories, i.e. a frequency-domain-based algorithm and a space-domain-based algorithm. The frequency-domain-based algorithm is to perform certain correction on a transformation coefficient value of an image in a certain transformation domain of the image, and is an indirect enhancement algorithm. For example, the image is considered as a two-dimensional signal, and is subjected to two-dimensional Fourier transform-based signal enhancement. The space-domain-based algorithm is divided into a point operation algorithm and a neighbourhood denoising algorithm. The point operation algorithm refers to gray level correction, gray transformation, histogram correction and the like, and is intended to implement uniform imaging of an image, or extend a dynamic range of the image and extend contrast. The neighbourhood denoising algorithm is divided into image smoothing and image sharpening. Image smoothing is usually configured to eliminate image noise, but may be likely to cause edge blur, and common smoothing algorithms include mean filtering, median filtering and the like. Image sharpening is intended to highlight an edge contour of an object to facilitate target identification, and common sharpening algorithms include a gradient method, an operator method, high-pass filtering, a mask matching method, a statistical difference method and the like.

However, all of the abovementioned image enhancement technologies have the same characteristic that the same enhancement operation is executed on each frame in a video, the adopted image enhancement algorithms are applicable to all the frames in the video, and are undiversified in means and inflexible in processing, enhancement effects may not meet requirements of frames in various scenarios, and particularly when contents of each frame in the video are greatly varied, quality of the video may be deteriorated.

SUMMARY

In view of this, the embodiment of the disclosure provides a video enhancement method and device, so as to improve video enhancement flexibility and quality of a video.

According to the embodiment of the disclosure, each frame in a video is sequentially acquired; for each current frame, attribute information reflecting a moving state or luminance is determined, a preset mapping relationship is searched to obtain a control parameter corresponding to the attribute information, and video enhancement operation is executed on the current frame by using the control parameter; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

BRIEF DESCRIPTION OF THE DRAWINGS

In order to describe the technical solutions in the embodiment of the disclosure more clearly, drawings required by description of the embodiment will be simply introduced below, the drawings described below are only some embodiments of the disclosure obviously, and those skilled in the art may further obtain other drawings according to these drawings on the premise of no creative work.

FIG. 22 is a diagram of a smoothing processing result according to another embodiment of the disclosure;

FIG. 23 is a diagram of video enhancement effect comparison according to another embodiment of the disclosure;

FIG. 24 is a structure diagram of a video enhancement device according to another embodiment of the disclosure;

DETAILED DESCRIPTION

In order to make a purpose, technical solutions and advantages of the disclosure clearer, implementation modes of the disclosure will be further described below with reference to the drawings in detail.

Figure 1:
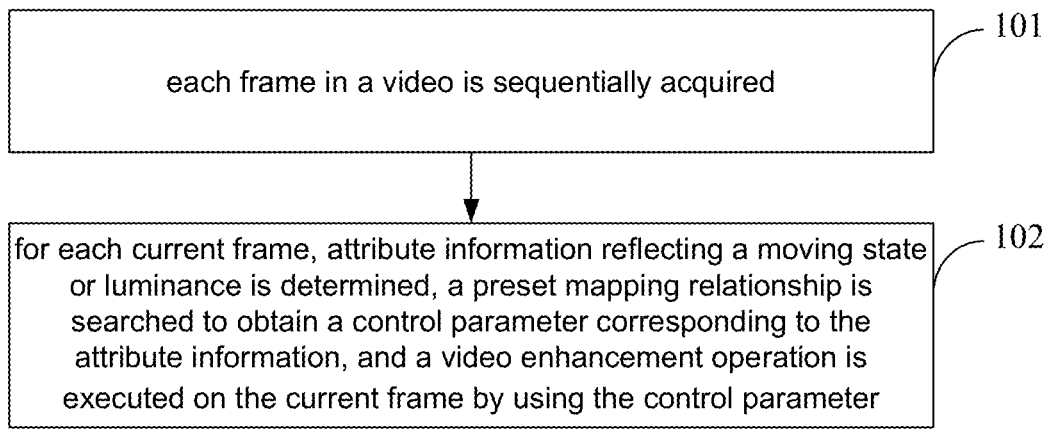
FIG. 1 is a flowchart of a video enhancement method according to an embodiment of the disclosure.

Referring to FIG. 1, an embodiment of the disclosure provides a video enhancement method, which includes:

101: each frame in a video is sequentially acquired.

Figure 2:
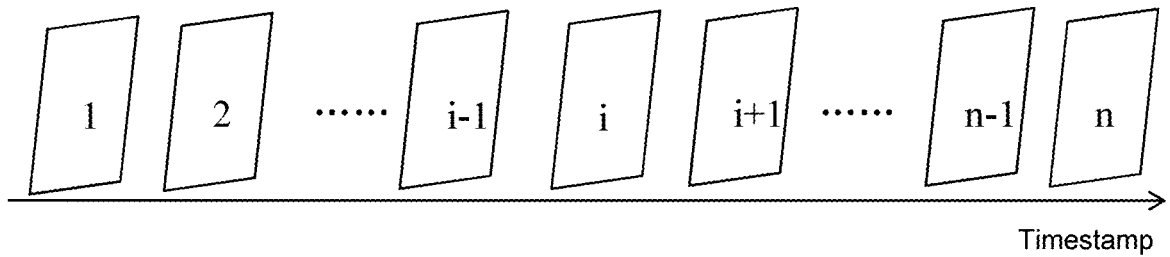
FIG. 2 is a diagram of a video frame sequence according to another embodiment of the disclosure.

In the embodiment, the step that each frame in the video is sequentially acquired refers to that each frame in a video frame sequence is acquired according to an arrangement of the frames. FIG. 2 is a diagram of a video frame sequence according to another embodiment of the disclosure. Wherein, a video includes a plurality of frames: a first frame, a second frame . . . an (i−1)th frame, an ith frame, an (i+1)th frame . . . an (n−1)th frame, an nth frame and the like.

102: for each current frame, attribute information reflecting a moving state or luminance is determined, a preset mapping relationship is searched to obtain a control parameter corresponding to the attribute information, and a video enhancement operation is executed on the current frame by using the control parameter.

In the embodiment, contents included in the frames in the video may usually describe their attributes from multiple aspects. The moving states may reflect whether persons, objects or sceneries in the frames are in a still state or a moving state. Luminance may reflect luminance of the frames. Human eyes may usually have different requirements on frames with different attributes, according to sense characteristics of the human eyes. For a still or bright scenario, human eyes usually require high definition; and for a moving or dark scenario, human eyes may appropriately reduce a requirement on definition.

In the embodiment, the step that the attribute information reflecting the moving state or the luminance is determined, the preset mapping relationship is searched to obtain the control parameter corresponding to the attribute information and a video enhancement operation is executed on the current frame by using the control parameter may optionally include that:

the attribute information, reflecting the moving state or the luminance, of the current frame is determined, a preset mapping relationship between attribute information and a control parameter is searched to obtain the control parameter of the current frame, and video enhancement operation is executed on the current frame by using the control parameter of the current frame; or, the current frame is divided into multiple regions, attribute information, reflecting a moving state or luminance, of each region is determined, the preset mapping relationship between the attribute information and the control parameter is searched to obtain a control parameter of each region, and video enhancement operation is executed on the current frame by using the control parameters of all the regions in the current frame.

In the embodiment, the step that the attribute information, reflecting the moving state or the luminance, of the current frame is determined and the preset mapping relationship between the attribute information and the control parameter is searched to obtain the control parameter of the current frame may optionally include that:

a Quantization Parameter (QP) of the current frame is calculated, and a preset mapping relationship between a QP and a control parameter is searched to obtain a control parameter corresponding to the QP; or, a scenario type of the current frame is determined, and a preset mapping relationship between a scenario type and a control parameter is searched to obtain a control parameter corresponding to the scenario type; or, a luminance value of the current frame is calculated, and a preset mapping relationship between a luminance value and a control parameter is searched to obtain a control parameter corresponding to the luminance value, wherein the control parameter includes at least one of: a contrast control parameter, a definition control parameter or a noise reduction control parameter.

In the embodiment, the step that the attribute information, reflecting the moving state or the luminance, of each region is determined and the preset mapping relationship between the attribute information and the control parameter is searched to obtain the control parameter of each region may optionally include that:

a QP of each region is calculated, and the preset mapping relationship between the QP and the control parameter is searched to obtain the control parameter of each region; or, a scenario type of each region is determined, and the preset mapping relationship between the scenario type and the control parameter is searched to obtain the control parameter of each region; or, a luminance value of each region is calculated, and the preset mapping relationship between the luminance value and the control parameter is searched to obtain the control parameter of each region, wherein the control parameter includes at least one of: a contrast control parameter, a definition control parameter or a noise reduction control parameter.

In the embodiment, the step that video enhancement operation is executed on the current frame by using the control parameter of the current frame may optionally include that:

a difference between the control parameter of the current frame and a control parameter of a previous frame is calculated, and whether an absolute value of the difference exceeds a specified threshold value or not is judged;

if the absolute value of the difference exceeds the specified threshold value, a new control parameter is calculated according to the control parameter of the previous frame and the threshold value, and video enhancement operation is executed on the current frame by using the new control parameter; and if the absolute value of the difference does not exceed the specified threshold value, video enhancement operation is executed on the current frame by using the control parameter of the current frame.

In the embodiment, before the step that video enhancement operation is executed on the current frame by using the control parameters of all the regions in the current frame, the method optionally further includes that:

for each region i in the current frame, whether absolute values of differences between control parameters of neighbouring regions and a control parameter of the region i exceed a specified threshold value or not is judged;

if an absolute value of a difference between a control parameter of at least one neighbouring region and the control parameter of the region i exceeds the specified threshold value, a new control parameter is calculated according to a preset algorithm, and the new control parameter is determined as the control parameter of the region i; and if the absolute values of the differences between the control parameters of all the neighbouring regions and the control parameter of the region i do not exceed the specified threshold value, the control parameter of the region i is kept unchanged.

In the embodiment, the step that the new control parameter is calculated according to the preset algorithm may optionally include that:

the new control parameter is calculated according to the control parameters of the neighbouring regions, under a principle that the absolute values of the differences with the control parameters of each neighbouring region do not exceed the specified threshold value; or, a weight is specified for each neighbouring region, and the new control parameter is calculated according to the control parameters and weights of the neighbouring regions.

In the embodiment, the mapping relationship may optionally be any one of the following three:

in the mapping relationship, a larger QP corresponds to a smaller contrast control parameter, and/or, a larger QP corresponds to a smaller definition control parameter, and/or, a larger QP corresponds to a larger noise reduction control parameter; or, in the mapping relationship, a higher movement degree represented by a scenario type corresponds to a smaller contrast control parameter, and/or, a higher movement degree represented by a scenario type corresponds to a smaller definition control parameter, and/or, a higher movement degree represented by a scenario type corresponds to a larger noise reduction control parameter; or, in the mapping relationship, a larger luminance value corresponds to a larger contrast control parameter, and/or, a larger luminance value corresponds to a larger definition control parameter, and/or, a larger luminance value corresponds to a smaller noise reduction control parameter.

In the embodiment, the scenario type optionally at least includes a still scenario and a moving scenario;

the still scenario includes: a desktop or document sharing scenario and/or a still person scenario; and the moving scenario includes: at least one of a slight moving scenario, an ordinary moving scenario, a large moving scenario and a strenuous moving scenario.

In the embodiment, after the step that video enhancement operation is executed on the current frame by using the control parameter, the method may optionally further include that: the video subjected to video enhancement operation is coded, and the coded video is sent.

In the embodiment, the step that each frame in the video is sequentially acquired may optionally include that:

the video is received, the video is decoded, and each frame in the decoded video is sequentially acquired.

According to the method provided by the embodiment, each frame in the video is sequentially acquired; for each current frame, the attribute information reflecting the moving state or the luminance is determined, the preset mapping relationship is searched to obtain the control parameter corresponding to the attribute information, and video enhancement operation is executed on the current frame by using the control parameter; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 3:
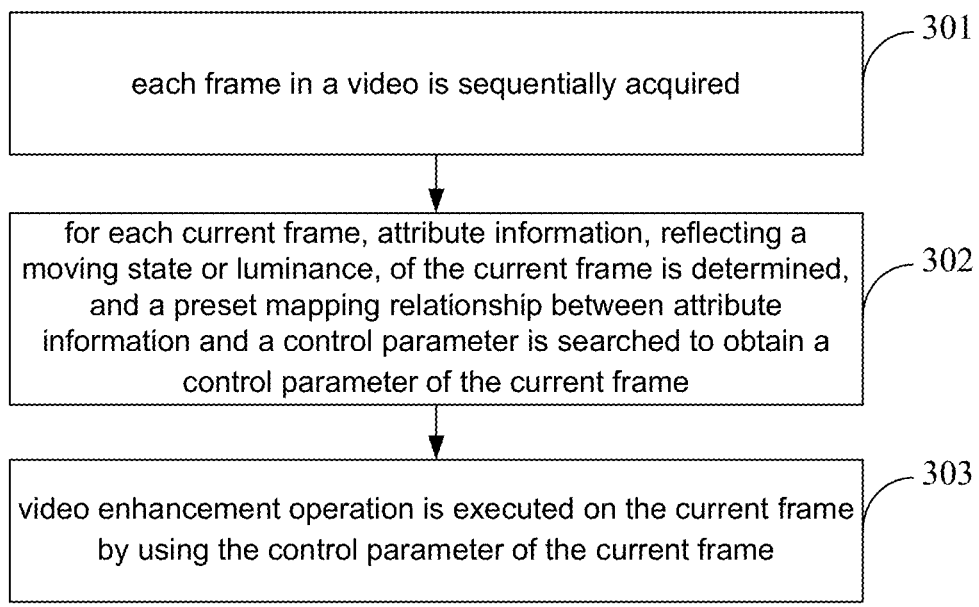
FIG. 3 is a flowchart of a video enhancement method according to another embodiment of the disclosure.

Referring to FIG. 3, another embodiment of the disclosure provides a video enhancement method, which includes:

301: each frame in a video is sequentially acquired;

302: for each current frame, attribute information, reflecting a moving state or luminance, of the current frame is determined, and a preset mapping relationship between attribute information and a control parameter is searched to obtain a control parameter of the current frame; and

303: video enhancement operation is executed on the current frame by using the control parameter of the current frame.

According to the method provided by the embodiment, each frame in the video is sequentially acquired; for each current frame, the attribute information reflecting the moving state or the luminance is determined, the preset mapping relationship between the attribute information and the control parameter is searched to obtain the control parameter of the current frame, and video enhancement operation is executed on the current frame by using the control parameter; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 4:
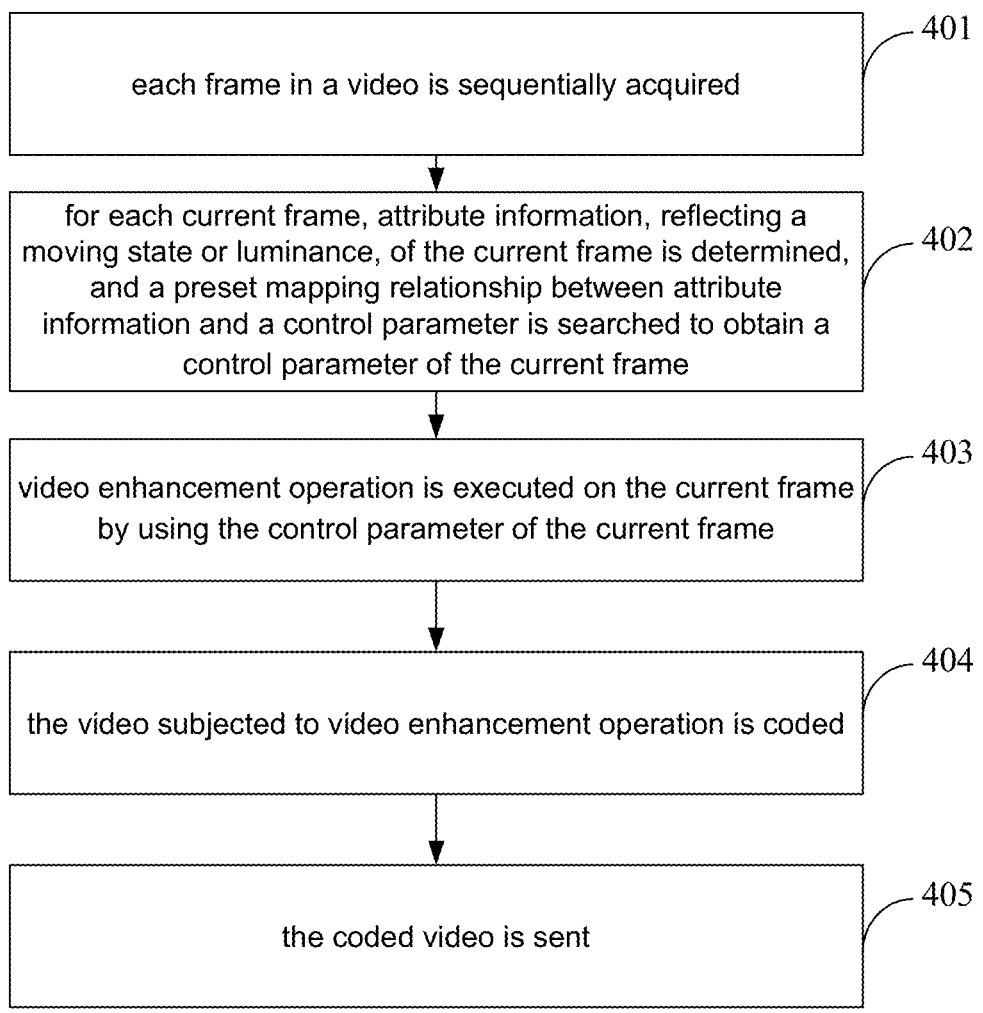
FIG. 4 is a flowchart of a video enhancement method according to another embodiment of the disclosure.

Referring to FIG. 4, another embodiment of the disclosure provides a video enhancement method, which includes:

401: each frame in a video is sequentially acquired;

402: for each current frame, attribute information, reflecting a moving state or luminance, of the current frame is determined, and a preset mapping relationship between attribute information and a control parameter is searched to obtain a control parameter of the current frame;

403: video enhancement operation is executed on the current frame by using the control parameter of the current frame;

404: the video subjected to video enhancement operation is coded, wherein, various coding methods may be adopted for coding the video, and will not be specifically limited in the embodiment; and 405: the coded video is sent.

Figure 5:
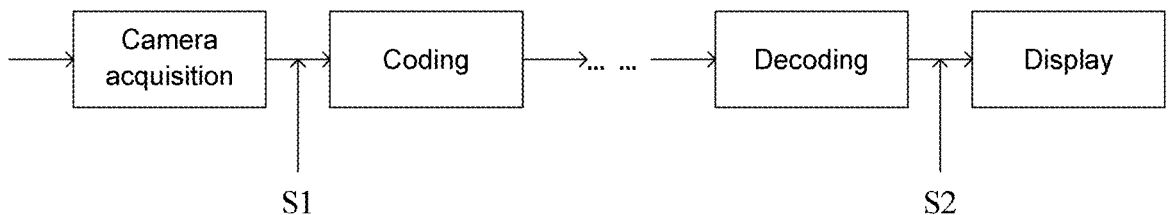
FIG. 5 is a diagram of each video processing link according to another embodiment of the disclosure.

FIG. 5 is a diagram of each video processing link according to another embodiment of the disclosure. Wherein, a camera acquisition unit acquires the video, and electronic equipment may send the video to other electronic equipment after coding the video. The camera acquisition unit may be located in the electronic equipment and may also be located in other equipment, which will not be specifically limited in the embodiment. Specifically, the video may be sent to other proximal electronic equipment through a local network, or may be sent to other remote electronic equipment through the Internet. After receiving the video, the other electronic equipment decodes the received video at first, and then displays the video. S1 shown in FIG. 5 is a link before coding, and S2 is a link after decoding. In the disclosure, the video enhancement method may be executed only in link S1, or the video enhancement method is executed only in link S2, or the two may be combined, that is, the video enhancement method may be executed in both link S1 and link S2. In the embodiment, video enhancement operation is executed in link S1, i.e. before coding.

Figure 6:
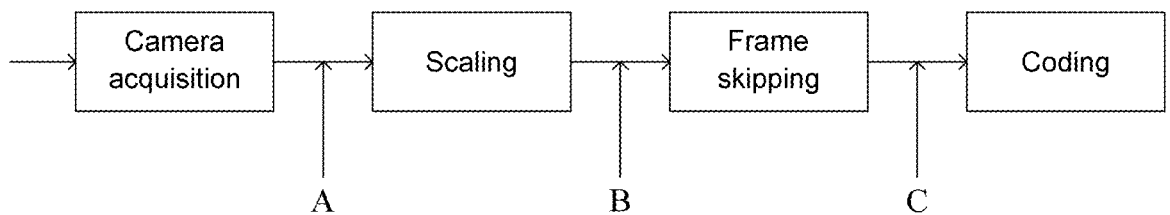
FIG. 6 is a diagram of each processing link before sending of a video according to another embodiment of the disclosure.

It is important to note that operation such as video scaling or frame skipping may usually be executed before video coding. FIG. 6 is a diagram of each processing link before sending of a video according to another embodiment of the disclosure. Wherein, before the video is coded, scaling processing and frame skipping processing may also be performed on the video. Scaling processing refers to scaling up or scaling down the video to achieve adaptability to a processing capability of electronic equipment. For example, an 800*600 video is scaled down to a 400*300 video, or the 400*300 video is scaled up to the 800*600 video. In addition, some electronic equipment itself has an intrinsic video enhancement function for example, performing enhancement processing by virtue of mean filtering. Such processing may be performed before coding, for example, before or after scaling, or before or after frame skipping. Frame skipping may also be called frame dropping, and frame skipping processing refers to processing of discarding some frames in a video sequence. As shown in FIG. 6, in the embodiment, the step that video enhancement operation is executed on the current frame by using the control parameter of the current frame may be executed in link A, i.e. before scaling, or may be executed in link B, i.e. before frame skipping, or may be executed in link C, i.e. before coding. Of course, if intrinsic enhancement processing is executed before coding, the step may also be executed before or after intrinsic enhancement processing, and there are no specific limits made in the embodiment.

According to the method provided by the embodiment, each frame in the video is sequentially acquired; for each current frame, the attribute information, reflecting the moving state or the luminance, of the current frame is determined, the preset mapping relationship between the attribute information and the control parameter is searched to obtain the control parameter of the current frame, and video enhancement operation is executed on the current frame by using the control parameter; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 7:
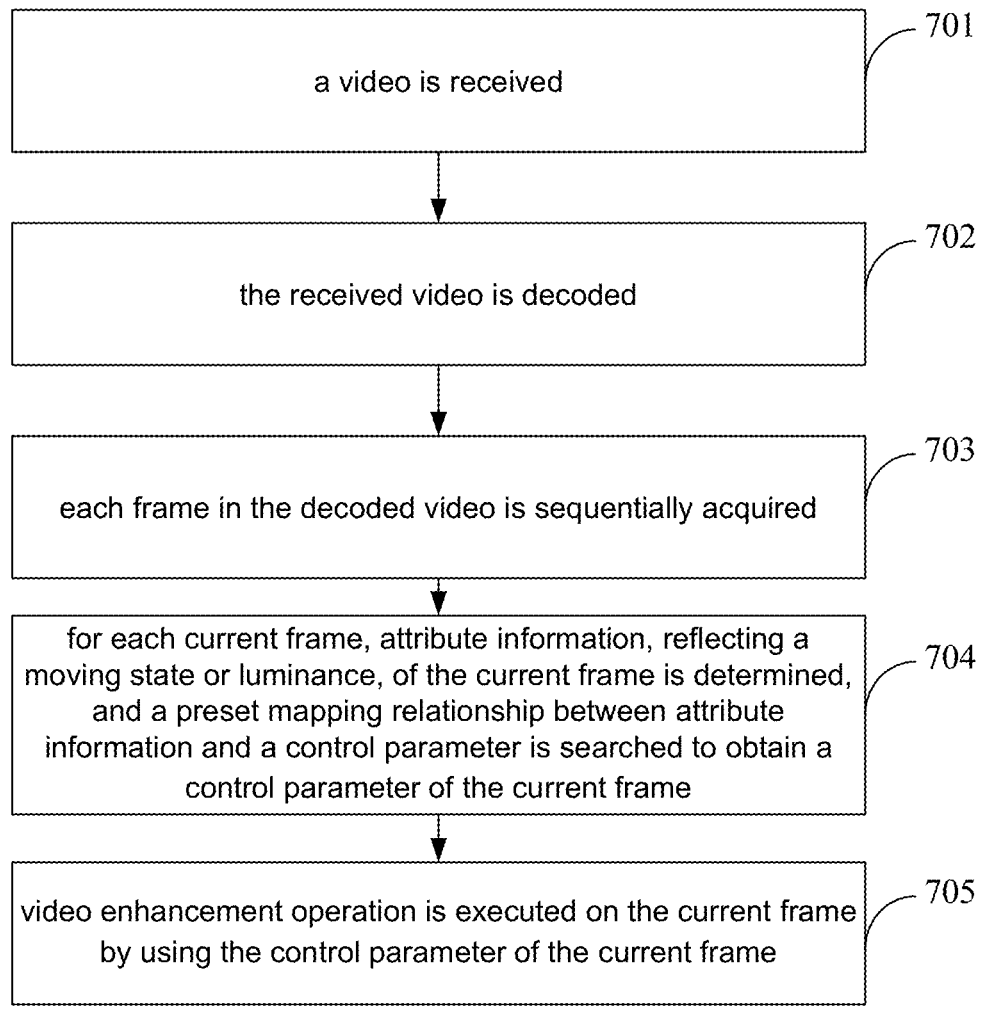
FIG. 7 is a flowchart of a video enhancement method according to another embodiment of the disclosure.

Referring to FIG. 7, another embodiment of the disclosure provides a video enhancement method, which includes:

701: a video is received;

702: the received video is decoded;

703: each frame in the decoded video is sequentially acquired;

704: for each current frame, attribute information, reflecting a moving state or luminance, of the current frame is determined, and a preset mapping relationship between attribute information and a control parameter is searched to obtain a control parameter of the current frame; and 705: video enhancement operation is executed on the current frame by using the control parameter of the current frame.

Referring to FIG. 5, in the embodiment, the step that video enhancement operation is executed on the current frame by using the control parameter of the current frame may be executed in link S2, i.e. after decoding operation. The method may be applied to electronic equipment, and after decoding the received video, the electronic equipment executes video enhancement operation on the decoded video, and then may locally display the video subjected to video enhancement operation.

Figure 8:
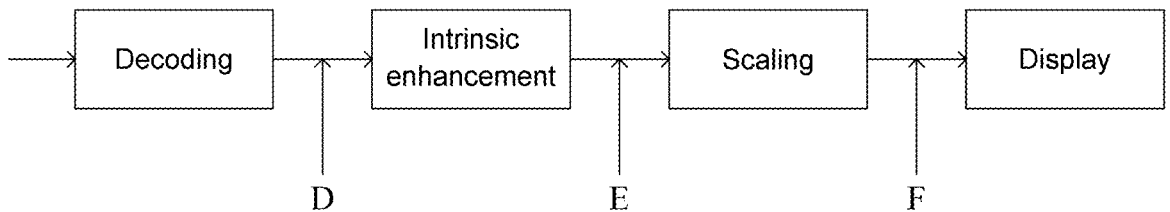
FIG. 8 is a diagram of each processing link after reception of a video according to another embodiment of the disclosure.

It is important to note that operation such as video scaling or intrinsic enhancement processing may usually be executed after video decoding. FIG. 8 is a diagram of each processing link after reception of a video according to another embodiment of the disclosure. After receiving the video, the electronic equipment may perform decoding processing, intrinsic enhancement processing, scaling processing or the like. Wherein, intrinsic enhancement processing refers to that the electronic equipment has a video enhancement function of, for example, performing video enhancement processing by virtue of a statistical difference method. As shown in FIG. 8, in the embodiment, the step that video enhancement operation is executed on the current frame by using the control parameter of the current frame may be executed in link D, i.e. before intrinsic enhancement processing, or may be executed in link E, i.e. before scaling, or may be executed in link F, i.e. after scaling, and there are no specific limits made in the embodiment.

According to the method provided by the embodiment, the video is received; the received video is decoded; each frame in the decoded video is sequentially acquired; for each current frame, the attribute information, reflecting the moving state or the luminance, of the current frame is determined, and the preset mapping relationship between the attribute information and the control parameter is searched to obtain the control parameter of the current frame; video enhancement operation is executed on the current frame by using the control parameter of the current frame; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 9:
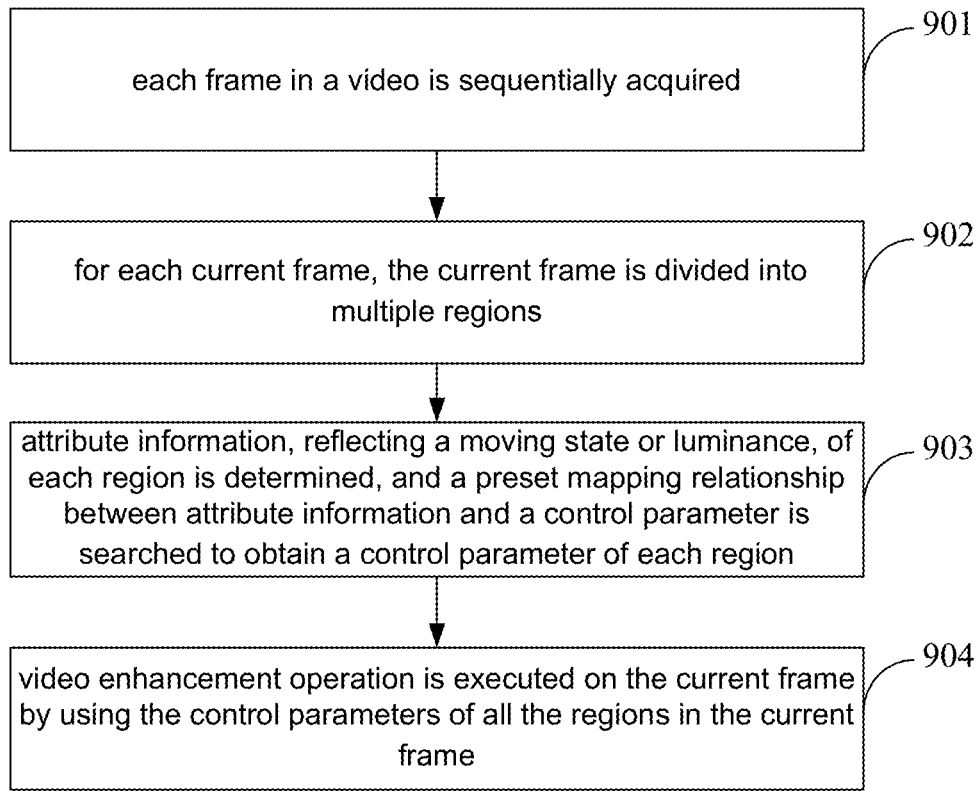
FIG. 9 is a flowchart of a video enhancement method according to another embodiment of the disclosure.

Referring to FIG. 9, another embodiment of the disclosure provides a video enhancement method, which includes the following steps.

901: each frame in a video is sequentially acquired.

902: for each current frame, the current frame is divided into multiple regions.

In the embodiment, multiple region division manners may be adopted, which will not be specifically limited. Each divided region may have various shapes, such as a rectangle, a square and the like. Each region may have the same size and may have different sizes, which will not be specifically limited in the embodiment. For example, a frame is divided into 4*4 regions, transversely including 4 regions and longitudinally including 4 regions, or is divided into 16*16 regions, transversely including 16 regions and longitudinally including 16 regions, and the like.

Figure 10:
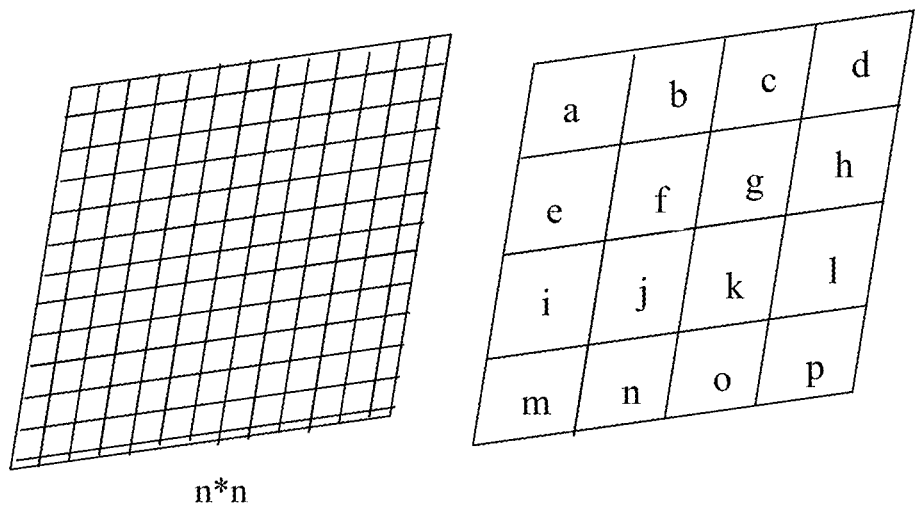
FIG. 10 is a diagram of division of a frame into multiple regions according to another embodiment of the disclosure.

For example, referring to FIG. 10, a frame may be divided into n*n regions, as shown in the left figure, or, may also be divided into 4*4 regions, as shown in the right figure. The 4*4 regions transversely include 4 rows with each row including 4 regions, and are uniformly divided, so that each divided region has the same size. Wherein, the first row includes regions a, b, c and d, the second row includes regions e, f, g and h, the third row includes regions i, j, k and l, and the fourth row includes regions m, n, o and p.

903: attribute information, reflecting a moving state or luminance, of each region is determined, and a preset mapping relationship between attribute information and a control parameter is searched to obtain a control parameter of each region.

904: video enhancement operation is executed on the current frame by using the control parameters of all the regions in the current frame.

According to the method provided by the embodiment, each frame in the video is sequentially acquired; for each current frame, the current frame is divided into multiple regions; the attribute information, reflecting the moving state or the luminance, of each region is determined, and the preset mapping relationship between the attribute information and the control parameter is searched to obtain the control parameter of each region; video enhancement operation is executed on the current frame by using the control parameters of all the regions in the current frame; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 11:
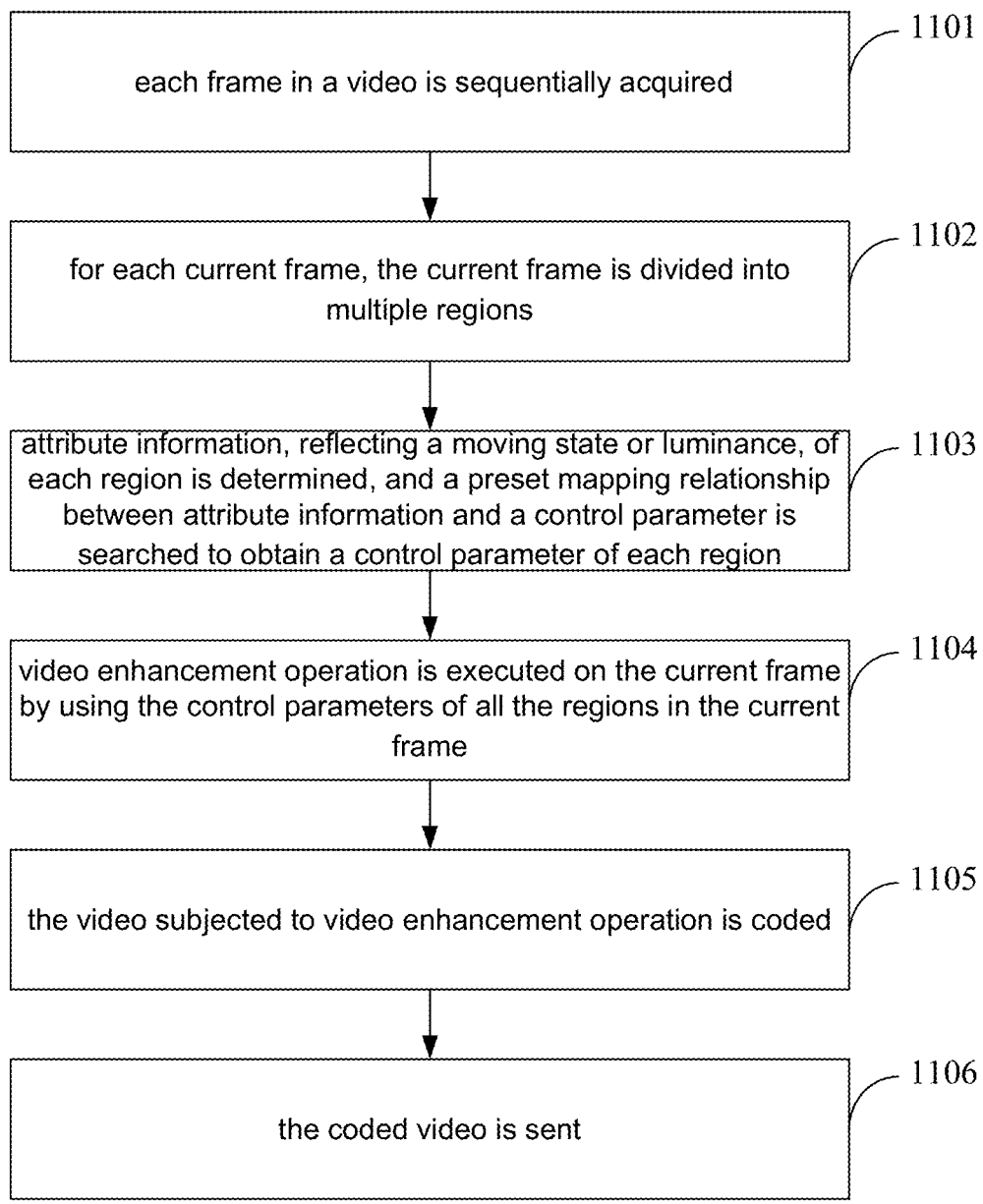
FIG. 11 is a flowchart of a video enhancement method according to another embodiment of the disclosure.

Referring to FIG. 11, another embodiment of the disclosure provides a video enhancement method, which includes:

1101: each frame in a video is sequentially acquired;

1102: for each current frame, the current frame is divided into multiple regions;

1103: attribute information, reflecting a moving state or luminance, of each region is determined, and a preset mapping relationship between attribute information and a control parameter is searched to obtain a control parameter of each region;

1104: video enhancement operation is executed on the current frame by using the control parameters of all the regions in the current frame;

1105: the video subjected to video enhancement operation is coded; and

1106: the coded video is sent.

According to the method provided by the embodiment, each frame in the video is sequentially acquired; for each current frame, the current frame is divided into multiple regions; the attribute information, reflecting the moving state or the luminance, of each region is determined, and the preset mapping relationship between the attribute information and the control parameter is searched to obtain the control parameter of each region; video enhancement operation is executed on the current frame by using the control parameters of all the regions in the current frame; the video subjected to video enhancement operation is coded; the coded video is sent; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 12:
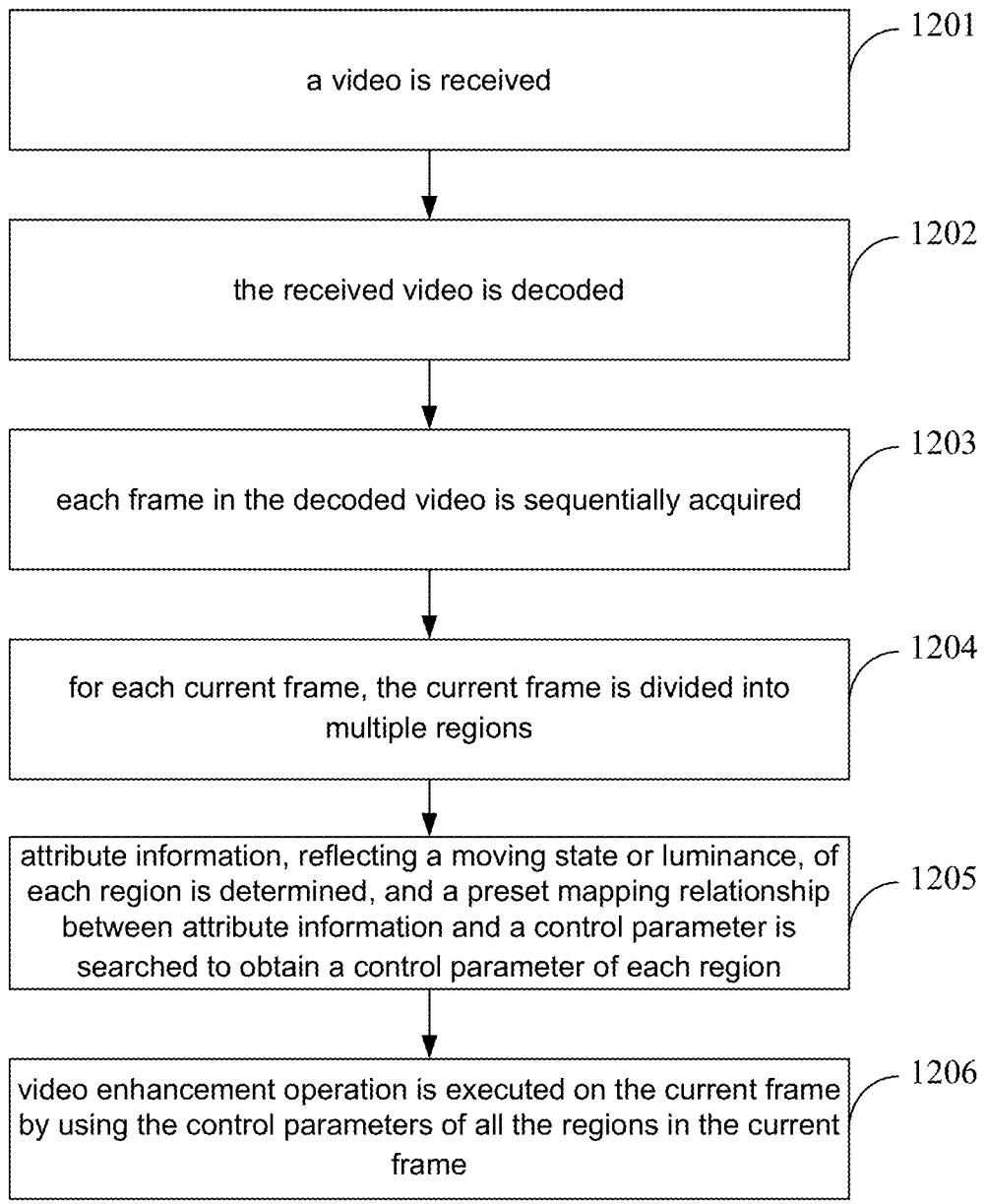
FIG. 12 is a flowchart of a video enhancement method according to another embodiment of the disclosure.

Referring to FIG. 12, another embodiment of the disclosure provides a video enhancement method, which includes:

1201: a video is received;

1202: the received video is decoded;

1203: each frame in the decoded video is sequentially acquired;

1204: for each current frame, the current frame is divided into multiple regions;

1205: attribute information, reflecting a moving state or luminance, of each region is determined, and a preset mapping relationship between attribute information and a control parameter is searched to obtain a control parameter of each region; and 1206: video enhancement operation is executed on the current frame by using the control parameters of all the regions in the current frame.

According to the method provided by the embodiment, the video is received; the received video is decoded; each frame in the decoded video is sequentially acquired; for each current frame, the current frame is divided into multiple regions; the attribute information, reflecting the moving state or the luminance, of each region is determined, and the preset mapping relationship between the attribute information and the control parameter is searched to obtain the control parameter of each region; video enhancement operation is executed on the current frame by using the control parameters of all the regions in the current frame; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 13:
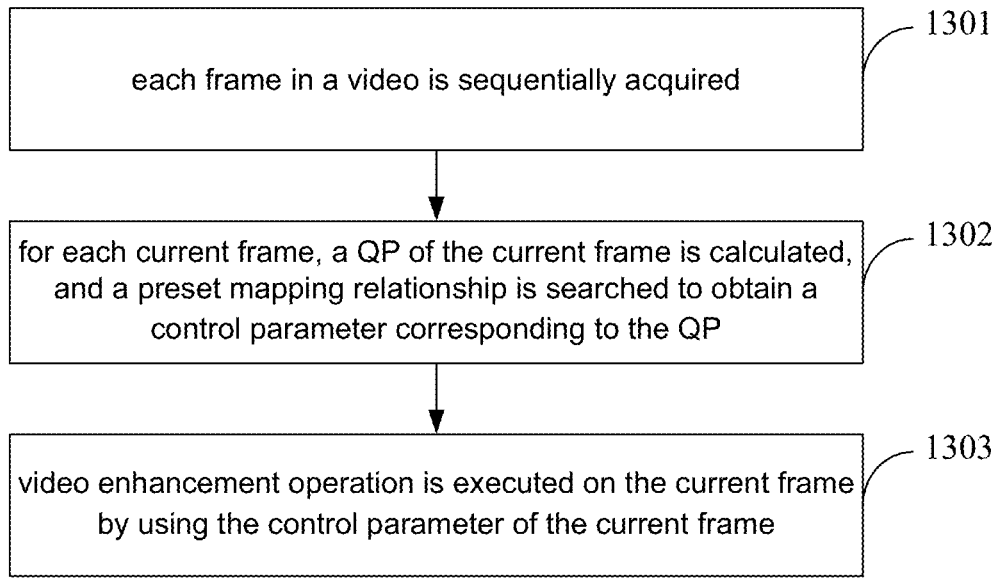
FIG. 13 is a flowchart of a video enhancement method according to another embodiment of the disclosure.

Referring to FIG. 13, another embodiment of the disclosure provides a video enhancement method, which processes the whole frame and includes the following steps.

1301: each frame in a video is sequentially acquired.

1302: for each current frame, a QP of the current frame is calculated, and a preset mapping relationship is searched to obtain a control parameter corresponding to the QP.

In the embodiment, a value of the QP may reflect a degree of a moving state of a video content. If the value of the QP is larger, it is indicated that a movement degree of the video content is higher, and for example, the video content is in a strenuous moving state. If the value of the QP is smaller, it is indicated that the movement degree of the video content is lower. For a scenario with a higher movement degree, it is usually impossible for human eyes to clearly see a certain part in a moving object. Therefore, for such a scenario, it is unnecessary to enhance a video content, or weak video enhancement may be performed. On the contrary, for a scenario with a lower movement degree, human eyes usually have a higher requirement on definition of a video content, and expect to clearly see every part. Therefore, for such a scenario, strong video enhancement is required.

In the embodiment, there are many QP calculation methods, for example, a method of employing a QP of a previous frame as a QP value of the current frame may be adopted, other methods may, of course, also be adopted, and there are no specific limits made in the embodiment.

In the preset mapping relationship, the QP may correspond to one or more control parameters. The control parameter includes, but not limited to: a contrast control parameter, a definition control parameter, a noise reduction control parameter or the like, which will not be specifically limited in the embodiment. Descriptions will be given below with the three parameters as an example. Wherein, the QP may correspond to any one or more of the three parameters. Preferably, the QP corresponds to the three parameters.

In the embodiment, the contrast control parameter is configured to regulate a contrast of the video content. Optionally, a value of the contrast control parameter may be set to be multiple levels, such as 0, 1, 2, 3 or 0, 2, 4, 6, 8, 10 or the like. Wherein, each level corresponds to a specific contrast value. When the contrast control parameter is regulated to a certain level, the video content is regulated according to a contrast value corresponding to the level. Optionally, it may be set that a video enhancement effect is better if the value of the contrast control parameter is larger and the video enhancement effect is poorer if the value of the contrast control parameter is smaller.

The definition control parameter is configured to regulate a definition of the video content. Optionally, a value of the definition control parameter may be set to be multiple levels, such as 0, 1, 2, 3 . . . or 0, 2, 4, 6, 8, 10 or the like. Wherein, each level corresponds to a specific definition value. When the definition control parameter is regulated to a certain level, the video content is regulated according to a definition value corresponding to the level. Optionally, it may be set that the video enhancement effect is better if the value of the definition control parameter is larger and the video enhancement effect is poorer if the value of the definition control parameter is smaller.

The noise reduction control parameter is configured to reduce noise of the video content. Optionally, a value of the noise reduction control parameter may be set to be multiple levels, such as 0, 1, 2, 3 . . . or 0, 2, 4, 6, 8, 10 or the like. Wherein, each level corresponds to a specific noise reduction value. When the noise reduction control parameter is regulated to a certain level, noise reduction regulation is performed on the video content according to a noise reduction value corresponding to the level. Optionally, it may be set that a video content noise reduction degree is higher if the value of the noise reduction control parameter is larger and the video content noise reduction degree is lower if the value of the noise reduction control parameter is smaller.

In addition, it is important to note that it may be QP values corresponding to control parameters in the mapping relationship, or, it may also be QP ranges corresponding to the control parameters, and there are no specific limits made in the embodiment. Preferably, a form that a QP range corresponds to a control parameter may be selected to improve a control effect.

For example, Table 1 shows a mapping relationship between QP ranges of the whole frame and each of a contrast control parameter, a definition control parameter and a noise reduction control parameter in the embodiment.

TABLE 1

| QPi | (0, 20] | (20, 25] | (25, 30] | (30, 35] | (35, 40] | (40, ∞] |
|---|---|---|---|---|---|---|
| α1 | 10 | 8 | 6 | 4 | 2 | 0 |
| α2 | 10 | 8 | 6 | 4 | 2 | 0 |
| α3 | 0 | 2 | 4 | 6 | 8 | 10 |

Wherein, $\alpha1$ is the contrast control parameter, $\alpha2$ is the definition control parameter, and $\alpha3$ is the noise reduction control parameter. QPi is a QP of the current frame (ith frame), and has 6 value ranges corresponding to 6 different values of the contrast control parameter $\alpha1$, 6 different values of the definition control parameter $\alpha2$ and 6 different values of the noise reduction control parameter $\alpha3$ respectively. As shown in Table 1: when QP≤20, $\alpha1=10$, $\alpha2=10$ and $\alpha3=0$; when 20<QPi≤25, $\alpha1=8$, $\alpha2=8$ and $\alpha3=2$ when 35<QPi≤40, $\alpha1=2$, $\alpha2=2$ and $\alpha3=8$; and when 40<QPi, $\alpha1=0$, $\alpha2=0$ and $\alpha3=10$. Of course, other manners or other numerical values may also be adopted to set the mapping relationship between the QP and each control parameter, which will not be specifically limited in the embodiment.

In the embodiment, QP values are divided into different intervals, and lengths of the intervals may be set according to a requirement, for example: 5 QP values may form an interval, such as 20, 25, 30, 35, 40 . . . or, 2 QP values may form an interval. There are no specific limits made in the embodiment.

1303: video enhancement operation is executed on the current frame by using the control parameter of the current frame.

Furthermore, in order to avoid an enhancement effect of neighbouring frames being greatly changed, smoothing processing may be performed.

For example, if a contrast control parameter $\alpha1$ of the current frame is 6, a contrast control parameter $\alpha1$ of a previous frame is 2 and a specified threshold value is 3, a difference is 6−2=4 and 4>3. Therefore, $\alpha1$ of the previous frame and the threshold value may be added to calculate $\alpha1=2+3=5$ of the current frame according to that $\alpha1$ of the current frame is larger than $\alpha1$ of the previous frame to further ensure that the difference between the contrast control parameters of the two neighbouring frames does not exceed the specified threshold value.

For example, if a definition control parameter $\alpha2$ of the current frame is 4, a definition control parameter $\alpha2$ of the previous frame is 8 and a specified threshold value is 3, a difference is 8−4=4 and 4>2. Therefore, the threshold value may be subtracted from $\alpha2$ of the previous frame to calculate $\alpha2=8-2=6$ of the current frame according to that $\alpha2$ of the current frame is smaller than $\alpha2$ of the previous frame to further ensure that the difference between the definition control parameters of the two neighbouring frames does not exceed the specified threshold value.

By smoothing processing, a sudden change effect may be avoided even though contents of the two neighbouring frames are greatly changed during video enhancement, smooth and more natural transition is ensured, and a user experience is improved.

The method provided by the embodiment may be executed in any processing link of a video frame, such as link A, link B or link C in FIG. 6 and link D, link E or link F in FIG. 8, and there are no specific limits made in the embodiment.

According to the method provided by the embodiment, each frame in the video is sequentially acquired; for each current frame, the QP of the current frame is calculated, the preset mapping relationship is searched to obtain the control parameter corresponding to the QP, and video enhancement operation is executed on the current frame by using the control parameter of the current frame; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 14:
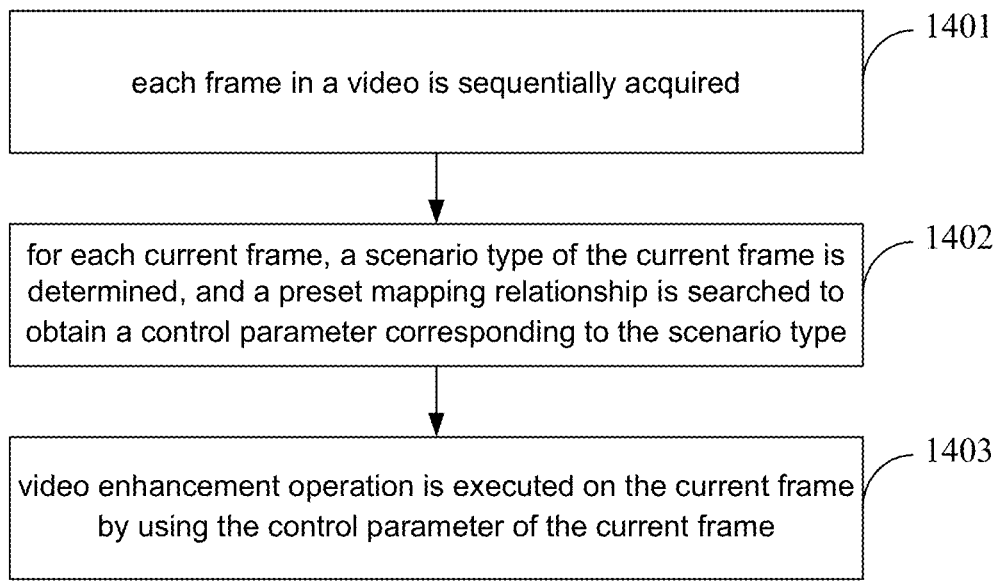
FIG. 14 is a flowchart of a video enhancement method according to another embodiment of the disclosure.

Referring to FIG. 14, another embodiment of the disclosure provides a video enhancement method, which processes the whole frame and includes the following steps.

1401: each frame in a video is sequentially acquired.

1402: for each current frame, a scenario type of the current frame is determined, and a preset mapping relationship is searched to obtain a control parameter corresponding to the scenario type.

In the embodiment, the scenario type may reflect a degree of a moving state or still state of a video content. The scenario type at least includes a still scenario and a moving scenario; and the still scenario includes: a desktop or document sharing scenario and/or a still person scenario. The moving scenario includes: at least one of a slight moving scenario, an ordinary moving scenario, a large moving scenario and a strenuous moving scenario. Wherein, the desktop or document sharing scenario refers to a scenario where a terminal shares own current desktop content or document to another terminal, and the scenario is a still object scenario. The still person scenario refers to that there is a person in the video content and the person is in a still state.

For a scenario with a higher movement degree, it is usually impossible for human eyes to clearly see a certain part in a moving object. Therefore, for such a scenario, it is unnecessary to enhance a video content, or weak video enhancement may be performed. On the contrary, for a scenario with a lower movement degree, human eyes usually have a higher requirement on definition of a video content, and expect to clearly see every part. Therefore, for such a scenario, strong video enhancement is required.

In the preset mapping relationship between a scenario type and a control parameter, the scenario type may correspond to one or more control parameters. The control parameter includes, but not limited to: a contrast control parameter, a definition control parameter, a noise reduction control parameter or the like, which will not be specifically limited in the embodiment. Descriptions will be given below with the three parameters as an example. Wherein, the scenario type may correspond to any one or more of the three parameters. Preferably, the scenario type corresponds to the three parameters.

In the embodiment, the contrast control parameter is configured to regulate a contrast of the video content. Optionally, a value of the contrast control parameter may be set to be multiple levels. The definition control parameter is configured to regulate a definition of the video content. Optionally, a value of the definition control parameter may be set to be multiple levels. The noise reduction control parameter is configured to reduce noise of the video content. Optionally, a value of the noise reduction control parameter may be set to be multiple levels. Detailed descriptions about these parameters refer to descriptions in the abovementioned embodiment, and will not be elaborated herein.

For example, Table 2 shows a mapping relationship between a scenario type and each of a contrast control parameter, a definition control parameter and a noise reduction control parameter in the embodiment.

TABLE 2

| Scenario type of ith frame | Desktop/ document sharing | Still person scenario | Slight moving scenario | Ordinary moving scenario | Large moving scenario | Strenuous moving scenario |
|---|---|---|---|---|---|---|
| α1 | 10 | 8 | 6 | 4 | 2 | 0 |
| α2 | 10 | 8 | 6 | 4 | 2 | 0 |
| α3 | 0 | 2 | 4 | 6 | 8 | 10 |

Wherein, α1 is the contrast control parameter, α2 is the definition control parameter, and α3 is the noise reduction control parameter. There are 6 scenario types of the current ith frame, corresponding to 6 different values of the contrast control parameter α1, 6 different values of the definition control parameter α2 and 6 different values of the noise reduction control parameter α3 respectively. As shown in Table 2: when the scenario type of the ith frame is desktop or document sharing, α1=10, α2=10 and α3=0; when the scenario type of the ith frame is a still person scenario, α1=8, α2=8 and α3=2 . . . when the scenario type of the ith frame is a large moving scenario, α1=2, α2=2 and α3=8; and when the scenario type of the ith frame is a strenuous moving scenario, α1=0, α2=0 and α3=10. Of course, other manners or other numerical values may also be adopted to set the mapping relationship between the scenario type and each control parameter, which will not be specifically limited in the embodiment.

1403: video enhancement operation is executed on the current frame by using the control parameter of the current frame.

Furthermore, in order to avoid an enhancement effect of neighbouring frames being greatly changed, smoothing processing may be performed.

By smoothing processing, a sudden change effect may be avoided even though contents of two neighbouring frames are greatly changed during video enhancement, smooth and more natural transition is ensured, and a user experience is improved.

The method provided by the embodiment may be executed in any processing link of a video frame, such as link A, link B or link C in FIG. 6 and link D, link E or link F in FIG. 8, and there are no specific limits made in the embodiment.

According to the method provided by the embodiment, each frame in the video is sequentially acquired; for each current frame, the scenario type of the current frame is determined, the preset mapping relationship is searched to obtain the control parameter corresponding to the scenario type, and video enhancement operation is executed on the current frame by using the control parameter of the current frame; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 15:
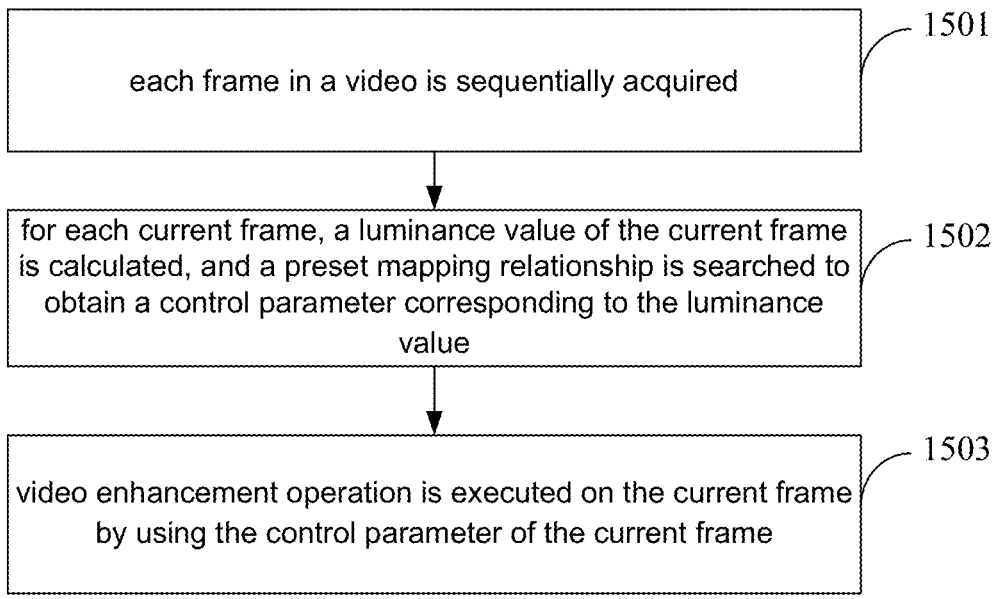
FIG. 15 is a flowchart of a video enhancement method according to another embodiment of the disclosure.

Referring to FIG. 15, another embodiment of the disclosure provides a video enhancement method, which processes the whole frame and includes the following steps.

1501: each frame in a video is sequentially acquired.

1502: for each current frame, a luminance value of the current frame is calculated, and a preset mapping relationship is searched to obtain a control parameter corresponding to the luminance value.

In the embodiment, the luminance value of the current frame may reflect a luminance state of a video content. The luminance value may be a mean of luminance of each pixel in the current frame. When the luminance value of the current frame is larger, it is indicated that the frame is brighter; and when the luminance value of the current frame is smaller, it is indicated that the frame is darker.

For a darker scenario, it is almost impossible for human eyes to clearly see every part. For example, in a scenario where video chatting is performed in a room with a lamp turned off, a background is usually dark and may not be seen clearly, and at this point, human eyes may not have any strict requirement on definition. Therefore, for such a scenario, it is unnecessary to enhance the video content, or weak video enhancement may be performed. On the contrary, for a brighter scenario, human eyes usually have a higher requirement on the definition of the video content, and expect to clearly see every part. Therefore, for such a scenario, strong video enhancement is required.

In the preset mapping relationship between a luminance value and a control parameter, the luminance value may correspond to one or more control parameters. The control parameter includes, but not limited to: a contrast control parameter, a definition control parameter, a noise reduction control parameter or the like, which will not be specifically limited in the embodiment. Descriptions will be given below with the three parameters as an example. Wherein, the luminance value may correspond to any one or more of the three parameters. Preferably, the luminance value corresponds to the three parameters.

In the embodiment, the contrast control parameter is configured to regulate a contrast of the video content. Optionally, a value of the contrast control parameter may be set to be multiple levels. The definition control parameter is configured to regulate a definition of the video content. Optionally, a value of the definition control parameter may be set to be multiple levels. The noise reduction control parameter is configured to reduce noise of the video content. Optionally, a value of the noise reduction control parameter may be set to be multiple levels. Detailed descriptions about these parameters refer to descriptions in the abovementioned embodiment, and will not be elaborated herein.

For example, Table 3 shows a mapping relationship between a luminance value and each of a contrast control parameter, a definition control parameter and a noise reduction control parameter in the embodiment.

TABLE 3

| Lumai | (0, 50] | (50, 80] | (80, 100] | (100, 150] | (150, 200] | (200, ∞] |
|---|---|---|---|---|---|---|
| α1 | 0 | 2 | 4 | 6 | 8 | 10 |
| α2 | 0 | 2 | 4 | 6 | 8 | 10 |
| α3 | 10 | 8 | 6 | 4 | 2 | 0 |

Wherein, α1 is the contrast control parameter, α2 is the definition control parameter, α3 is the noise reduction control parameter and lumai is the luminance value of the current ith frame. The luminance value has 6 value ranges, corresponding to 6 different values of the contrast control parameter α1, 6 different values of the definition control parameter α2 and 6 different values of the noise reduction control parameter α3 respectively. As shown in Table 3: when lumai≤50, α1=0, α2=0 and α3=10; when 50<lumai≤80, α1=2, α2=2 and α3=8 . . . when 150<lumai≤200, α1=8, α2=8 and α3=2; and when 200<lumai, α1=10, α2=10 and α3=0. Of course, other manners or other numerical values may also be adopted to set the mapping relationship between the luminance value and each control parameter, which will not be specifically limited in the embodiment.

1503: video enhancement operation is executed on the current frame by using the control parameter of the current frame.

Furthermore, in order to avoid an enhancement effect of neighbouring frames being greatly changed, smoothing processing may be performed.

By smoothing processing, a sudden change effect may be avoided even though contents of two neighbouring frames are greatly changed during video enhancement, smooth and more natural transition is ensured, and a user experience is improved.

The method provided by the embodiment may be executed in any processing link of a video frame, such as link A, link B or link C in FIG. 6 and link D, link E or link F in FIG. 8, and there are no specific limits made in the embodiment.

According to the method provided by the embodiment, each frame in the video is sequentially acquired; for each current frame, the luminance value of the current frame is calculated, the preset mapping relationship is searched to obtain the control parameter corresponding to the luminance value, and video enhancement operation is executed on the current frame by using the control parameter of the current frame; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 16:
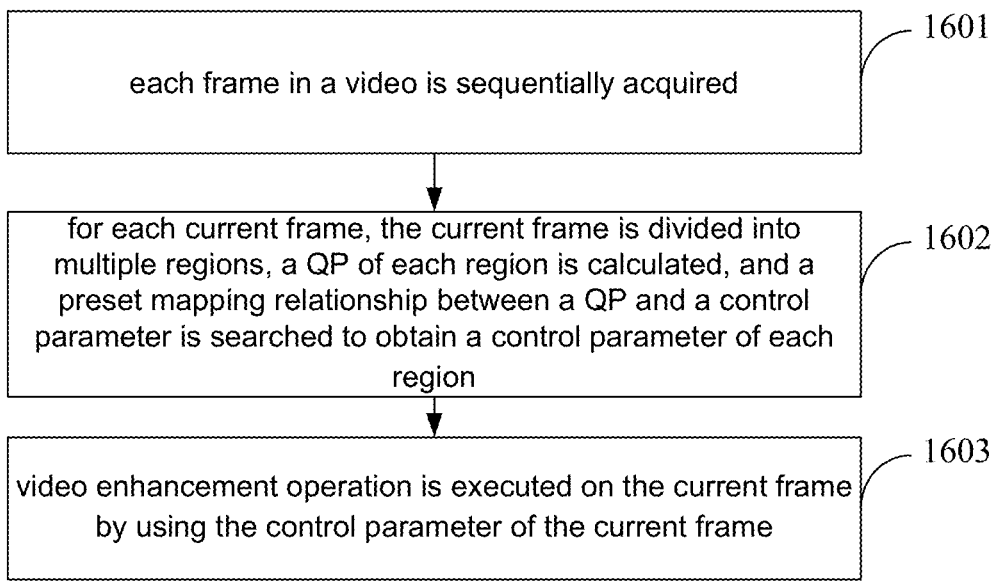
FIG. 16 is a flowchart of a video enhancement method according to another embodiment of the disclosure.

Referring to FIG. 16, another embodiment of the disclosure provides a video enhancement method, which processes regions after a frame is divided into the regions and includes the following steps.

1601: each frame in a video is sequentially acquired.

1602: for each current frame, the current frame is divided into multiple regions, a QP of each region is calculated, and a preset mapping relationship between a QP and a control parameter is searched to obtain a control parameter of each region.

Wherein, region division may be implemented by multiple manners. For example, the regions may be divided according to a moving state and the QP, and the regions include, but not limited to: a texture region, a large moving region, an ordinary moving region, a still region, a Region of Interest (ROI) and the like.

The control parameter includes, but not limited to: any one or more of a contrast control parameter, a definition control parameter and a noise reduction control parameter, and there are no specific limits made in the embodiment.

For example, Table 4 shows a mapping relationship between a QP range of a region of a current frame and each of a contrast control parameter, a definition control parameter and a noise reduction control parameter in the embodiment.

TABLE 4

| QPij | (0, 20] | (20, 25] | (25, 30] | (30, 35] | (35, 40] | (40, ∞] |
|---|---|---|---|---|---|---|
| α1 | 10 | 8 | 6 | 4 | 2 | 0 |
| α2 | 10 | 8 | 6 | 4 | 2 | 0 |
| α3 | 0 | 2 | 4 | 6 | 8 | 10 |

Wherein, α1 is the contrast control parameter, α2 is the definition control parameter, and α3 is the noise reduction control parameter. The current frame is the ith frame, and QPij is a QP of the jth region of the ith frame, and has 6 value ranges corresponding to 6 different values of the contrast control parameter α1, 6 different values of the definition control parameter α2 and 6 different values of the noise reduction control parameter α3 respectively. As shown in Table 4: when QPij≤20, α1=10, α2=10 and α3=0; when 20<QPij≤25, α1=8, α2=8 and α3=2 when 35<QPij≤40, α1=2, α2=2 and α3=8; and when 40<QPij, α1=0, α2=0 and α3=10. Of course, other manners or other numerical values may also be adopted to set the mapping relationship between the QP and each control parameter, which will not be specifically limited in the embodiment.

1603: video enhancement operation is executed on the current frame by using the control parameter of the current frame.

Furthermore, in order to avoid an enhancement effect of neighbouring frames being greatly changed, smoothing processing may be performed.

By smoothing processing, a sudden change effect may be avoided even though contents of two neighbouring frames are greatly changed during video enhancement, smooth and more natural transition is ensured, and a user experience is improved.

The method provided by the embodiment may be executed in any processing link of a video frame, such as link A, link B or link C in FIG. 6 and link D, link E or link F in FIG. 8, and there are no specific limits made in the embodiment.

According to the method provided by the embodiment, each frame in the video is sequentially acquired; for each current frame, the current frame is divided into multiple regions, the QP of each region is calculated, the preset mapping relationship between the QP and the control parameter is searched to obtain the control parameter of each region, and video enhancement operation is executed on the current frame by using the control parameters of all the regions in the current frame; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 17:
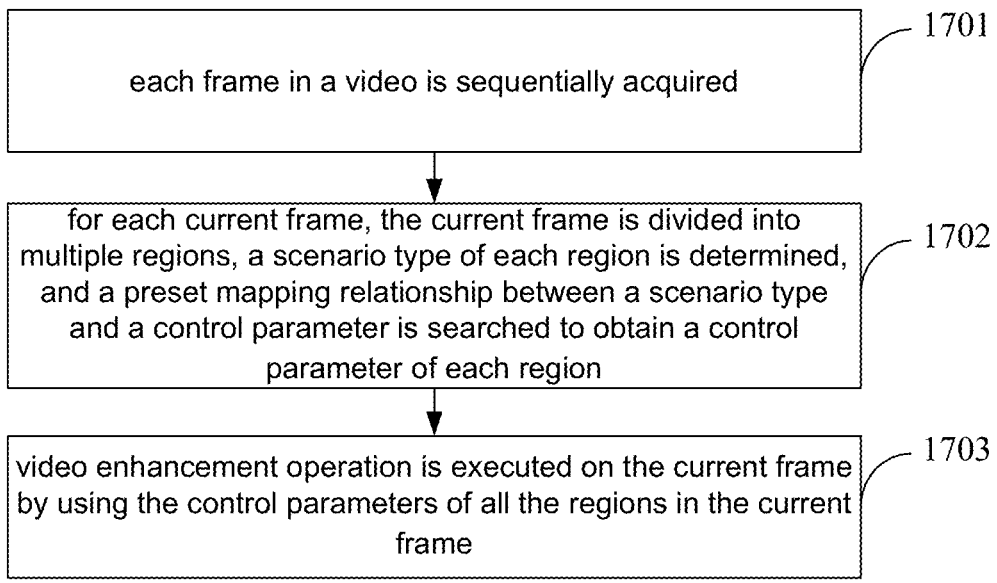
FIG. 17 is a flowchart of a video enhancement method according to another embodiment of the disclosure.

Referring to FIG. 17, another embodiment of the disclosure provides a video enhancement method, which processes regions after a frame is divided into the regions and includes the following steps.

1701: each frame in a video is sequentially acquired.

1702: for each current frame, the current frame is divided into multiple regions, a scenario type of each region is determined, and a preset mapping relationship between a scenario type and a control parameter is searched to obtain a control parameter of each region.

The control parameter includes, but not limited to: any one or more of a contrast control parameter, a definition control parameter and a noise reduction control parameter, and there are no specific limits made in the embodiment.

For example, Table 5 shows a mapping relationship between a scenario type of a region of a current frame and each of a contrast control parameter, a definition control parameter and a noise reduction control parameter in the embodiment.

TABLE 5

| Scenario type of ith frame | Desktop/ document sharing | Still person scenario | Slight moving scenario | Ordinary moving scenario | Large moving scenario | Strenuous moving scenario |
|---|---|---|---|---|---|---|
| α1 | 10 | 8 | 6 | 4 | 2 | 0 |
| α2 | 10 | 8 | 6 | 4 | 2 | 0 |
| α3 | 0 | 2 | 4 | 6 | 8 | 10 |

Wherein, α1 is the contrast control parameter, α2 is the definition control parameter, and α3 is the noise reduction control parameter. The current frame is the ith frame, and there are 6 scenario types of the ith region of the ith frame, corresponding to 6 different values of the contrast control parameter α1, 6 different values of the definition control parameter α2 and 6 different values of the noise reduction control parameter α3 respectively. As shown in Table 5: when the scenario type of the jth region of the ith frame is desktop or document sharing, α1=10, α2=10 and α3=0; when the scenario type of the jth region of the ith frame is a still person scenario, α1=8, α2=8 and a 3=2 . . . when the scenario type of the jth region of the ith frame is a large moving scenario, α1=2, α2=2 and α3=8; and when the scenario type of the jth region of the ith frame is a strenuous moving scenario, α1=0, α2=0 and α3=10. Of course, other manners or other numerical values may also be adopted to set the mapping relationship between the scenario type and each control parameter, which will not be specifically limited in the embodiment.

1703: video enhancement operation is executed on the current frame by using the control parameters of all the regions in the current frame.

Furthermore, in order to avoid an enhancement effect of neighbouring frames being greatly changed, smoothing processing may be performed.

By smoothing processing, a sudden change effect may be avoided even though contents of two neighbouring frames are greatly changed during video enhancement, smooth and more natural transition is ensured, and a user experience is improved.

The method provided by the embodiment may be executed in any processing link of a video frame, such as link A, link B or link C in FIG. 6 and link D, link E or link F in FIG. 8, and there are no specific limits made in the embodiment.

According to the method provided by the embodiment, each frame in the video is sequentially acquired; for each current frame, the current frame is divided into multiple regions, the scenario type of each region is determined, the preset mapping relationship between the scenario type and the control parameter is searched to obtain the control parameter of each region, and video enhancement operation is executed on the current frame by using the control parameters of all the regions in the current frame; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 18:
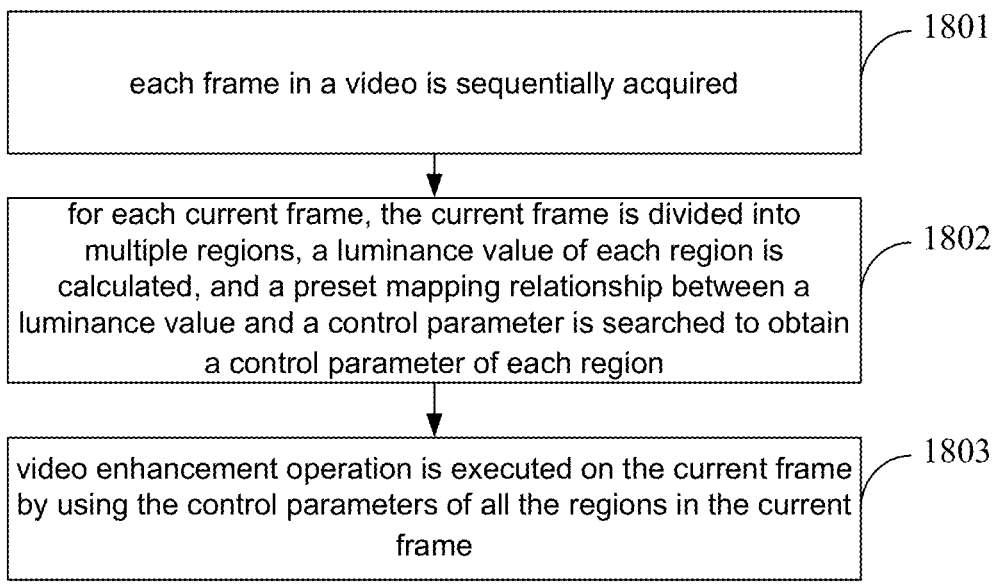
FIG. 18 is a flowchart of a video enhancement method according to another embodiment of the disclosure.

Referring to FIG. 18, another embodiment of the disclosure provides a video enhancement method, which processes regions after a frame is divided into the regions and includes the following steps.

1801: each frame in a video is sequentially acquired.

1802: for each current frame, the current frame is divided into multiple regions, a luminance value of each region is calculated, and a preset mapping relationship between a luminance value and a control parameter is searched to obtain a control parameter of each region.

Wherein, the luminance value of each region may be a mean of luminance values of all pixels in the region, which will not be specifically limited in the embodiment. The control parameter includes, but not limited to: any one or more of a contrast control parameter, a definition control parameter and a noise reduction control parameter, and there are no specific limits made in the embodiment.

For example, Table 6 shows a mapping relationship between a luminance value of the jth region of the ith frame and each of a contrast control parameter, a definition control parameter and a noise reduction control parameter in the embodiment.

TABLE 6

| Lumaij | (0, 50] | (50, 80] | (80, 100] | (100, 150] | (150, 200] | (200, ∞] |
|---|---|---|---|---|---|---|
| α1 | 0 | 2 | 4 | 6 | 8 | 10 |
| α2 | 0 | 2 | 4 | 6 | 8 | 10 |
| α3 | 10 | 8 | 6 | 4 | 2 | 0 |

Wherein, $\alpha 1$ is the contrast control parameter, $\alpha 2$ is the definition control parameter, $\alpha 3$ is the noise reduction control parameter, the current frame is the ith frame, and lumaij is the luminance value of the jth region of the ith frame. The luminance value has 6 value ranges, corresponding to 6 different values of the contrast control parameter $\alpha 1$, 6 different values of the definition control parameter $\alpha 2$ and 6 different values of the noise reduction control parameter $\alpha 3$ respectively. As shown in Table 6: when lumaij≤50, $\alpha 1=0$, $\alpha 2=0$ and $\alpha 3=10$; when 50<lumaij≤80, $\alpha 1=2$, $\alpha 2=2$ and $\alpha 3=8$ when 150<lumaij≤200, $\alpha 1=8$, $\alpha 2=8$ and $\alpha 3=2$; and when 200<lumaij, $\alpha 1=10$, $\alpha 2=10$ and $\alpha 3=0$. Of course, other manners or other numerical values may also be adopted to set the mapping relationship between the luminance value and each control parameter, which will not be specifically limited in the embodiment.

1803: video enhancement operation is executed on the current frame by using the control parameters of all the regions in the current frame.

Furthermore, in order to avoid an enhancement effect of neighbouring frames being greatly changed, smoothing processing may be performed.

By smoothing processing, a sudden change effect may be avoided even though contents of two neighbouring frames are greatly changed during video enhancement, smooth and more natural transition is ensured, and a user experience is improved.

Figures 19, 20, 21:
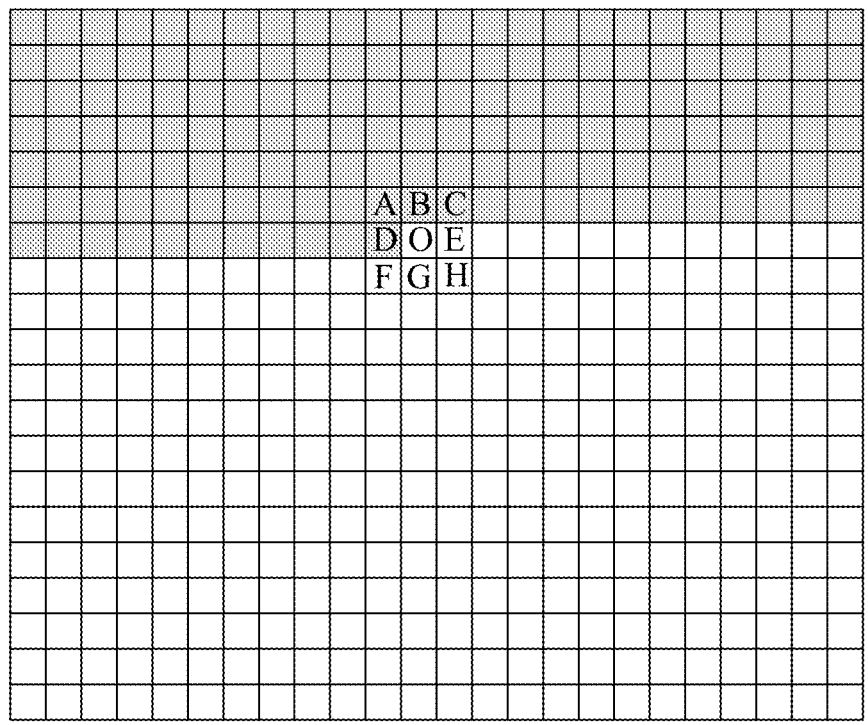
FIG. 19 is a diagram of division of a frame into regions according to another embodiment of the disclosure.
FIG. 20 is a diagram of luminance values of neighbouring regions according to another embodiment of the disclosure.
FIG. 21 is a diagram of contrast control parameters of neighbouring regions according to another embodiment of the disclosure.

For example, FIG. 19 is a diagram of division of a frame into regions according to another embodiment of the disclosure. Wherein, a region with a grey background is a region of which a control parameter has been determined, and a region with a white background is a region of which a control parameter has yet not been determined. Region O is a currently processed region, and neighbouring regions of region O include: region A, region B, region C, region D, region E, region F, region G and region H, wherein regions of which control parameters have been determined include: region A, region B, region C and region D. During smoothing processing, for a currently processed region, it is only necessary to consider neighbouring regions of which control parameters have been determined.

FIG. 20 is a diagram of luminance values of neighbouring regions according to another embodiment of the disclosure. Wherein, region O of a current frame is currently processed, and its neighbouring regions of which control parameters have been determined include region A, region B, region C and region D. Luminance values of the four regions are: L=60, L=80, L=140 and L=30 respectively. A luminance value L of region O is 160. The preset mapping relationship is searched for a contrast control parameter corresponding to each luminance value, and then the contrast control parameter $\alpha 1$ of each region shown in FIG. 21 may be obtained. Wherein, contrast control parameters of region A, region B, region C, region D and region O are $\alpha 1=2$, $\alpha 1=2$, $\alpha 1=6$, $\alpha 1=0$ and $\alpha 1=8$ respectively. If a specified difference threshold value of the contrast control parameters is 4, differences between the contrast control parameters of region O and each of neighbouring regions A, B, C and D are calculated respectively, and are compared with the specified threshold value, it can be seen that the difference 8-2 between region O and region A is more than 4, the difference 8-2 between region O and region B is more than 4, the difference 8-6 between region O and region C is less than 4 and the difference 8-2 between region O and region D is more than 4, and obviously, the differences between the contrast control parameters of region O and three neighbouring regions exceed the specified threshold value, so that smoothing processing is required. One method is to perform calculation in a manner that a difference with the contrast control parameter of any neighbouring region does not exceed the specified threshold value, and specifically, the minimum contrast control parameter $\alpha 1=0$ in the neighbouring regions is extracted and is added with the specified threshold value 4 to obtain a new contrast control parameter $\alpha 1'=4$ of region O. The other method is to set weight values 0.3, 0.4, 0.2 and 0.1 for the four neighbouring regions respectively and calculate the contrast control parameter $\alpha 1'=2\times 0.3+2\times 0.4+6\times 0.2+0\times 0.1=2.6\approx 3$ according to the weight values, a result being shown in FIG. 22.

The method provided by the embodiment may be executed in any processing link of a video frame, such as link A, link B or link C in FIG. 6 and link D, link E or link F in FIG. 8, and there are no specific limits made in the embodiment.

According to the method provided by the embodiment, each frame in the video is sequentially acquired; for each current frame, the current frame is divided into multiple regions, the luminance value of each region is calculated, the preset mapping relationship between the luminance value and the control parameter is searched to obtain the control parameter of each region, and video enhancement operation is executed on the current frame by using the control parameters of all the regions in the current frame; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

In order to better describe a video enhancement effect of the disclosure, descriptions will be given below with reference to FIG. 23. FIG. 23 is a diagram of video enhancement effect comparison according to another embodiment of the disclosure. Wherein, the abscissa axis is the number of frames of a video sequence, and a curve from the 100th frame to the 300th frame is displayed in the figure. The ordinate axis is a blurring feather value. Curve ① is a coding and decoding output curve of a video subjected to video enhancement by virtue of the method provided by the disclosure under the conditions of a 100 k bandwidth and a rate of 10 frames per second. Curve ② is a coding and decoding output curve of a video not subjected to video enhancement under the conditions of a 4M bandwidth, a rate of 10 frames per second and a fixed QP of 18. Curve ③ is a coding and decoding output curve of a video not subjected to video enhancement under the conditions of a 4M bandwidth, a rate of 10 frames per second and a fixed QP of 35. From the figure, it can directly be seen that a feather value of a video sequence subjected to video enhancement processing of the disclosure is obviously larger than a feather value of a video sequence not subjected to video enhancement processing, a good video enhancement effect and a good user experience are achieved and quality of the video is improved.

Referring to FIG. 24, another embodiment of the disclosure provides a video enhancement device, which includes:

an acquisition module 2401, configured to sequentially acquire each frame in a video; and an enhancement module 2402, configured to, for each current frame, determine attribute information reflecting a moving state or luminance, search a preset mapping relationship to obtain a control parameter corresponding to the attribute information, and execute video enhancement operation on the current frame by using the control parameter.

In the embodiment, the enhancement module may optionally include:

a first enhancement sub-module, configured to, for each current frame, determine the attribute information, reflecting the moving state or the luminance, of the current frame, search a preset mapping relationship between attribute information and a control parameter to obtain the control parameter of the current frame, and execute a video enhancement operation on the current frame by using the control parameter of the current frame; or, a second enhancement sub-module, configured to, for each current frame, divide the current frame into multiple regions, determine attribute information, reflecting a moving state or luminance, of each region, search the preset mapping relationship between the attribute information and the control parameter to obtain a control parameter of each region, and execute a video enhancement operation on the current frame by using the control parameters of all the regions in the current frame.

In the embodiment, the first enhancement sub-module may optionally be configured to:

for each current frame, calculate a QP of the current frame, search a preset mapping relationship to obtain a control parameter corresponding to the QP, and execute a video enhancement operation on the current frame by using the control parameter; or, for each current frame, determine a scenario type of the current frame, search a preset mapping relationship to obtain a control parameter corresponding to the scenario type, and execute video enhancement operation on the current frame by using the control parameter; or, for each current frame, calculate a luminance value of the current frame, search a preset mapping relationship to obtain a control parameter corresponding to the luminance value, and execute a video enhancement operation on the current frame by using the control parameter, wherein the control parameter includes at least one of: a contrast control parameter, a definition control parameter or a noise reduction control parameter.

In the embodiment, the second enhancement sub-module may optionally be configured to:

for each current frame, divide the current frame into multiple regions, calculate a QP of each region, search a preset mapping relationship between a QP and a control parameter to obtain the control parameter of each region, and execute a video enhancement operation on the current frame by using the control parameters of all the regions in the current frame; or, for each current frame, divide the current frame into multiple regions, determine a scenario type of each region, search a preset mapping relationship between a scenario type and a control parameter to obtain the control parameter of each region, and execute video enhancement operation on the current frame by using the control parameters of all the regions in the current frame; or, for each current frame, divide the current frame into multiple regions, calculate a luminance value of each region, search a preset mapping relationship between a luminance value and a control parameter to obtain the control parameter of each region, and execute a video enhancement operation on the current frame by using the control parameters of all the regions in the current frame, wherein the control parameter includes at least one of: a contrast control parameter, a definition control parameter or a noise reduction control parameter.

In the embodiment, the first enhancement sub-module may optionally include:

a frame smoothing processing unit, configured to calculate a difference between the control parameter of the current frame and a control parameter of a previous frame, and judge whether an absolute value of the difference exceeds a specified threshold value or not; if the absolute value exceeds the specified threshold value, calculate a new control parameter according to the control parameter of the previous frame and the threshold value, and execute video enhancement operation on the current frame by using the new control parameter; and if the absolute value does not exceed the specified threshold value, execute video enhancement operation on the current frame by using the control parameter of the current frame.

In the embodiment, the second enhancement sub-module may optionally include:

a region smoothing processing unit, configured to, before executing video enhancement operation on the current frame by using the control parameters of all the regions in the current frame, for each region i in the current frame, judge whether absolute values of differences between control parameters of neighbouring regions and a control parameter of the region i exceed a specified threshold value or not; if an absolute value of a difference between a control parameter of at least one neighbouring region and the control parameter of the region i exceeds the specified threshold value, calculate a new control parameter according to a preset algorithm, and determine the new control parameter as the control parameter of the region i; and if the absolute values of the differences between the control parameters of all the neighbouring regions and the control parameter of the region i do not exceed the specified threshold value, keep the control parameter of the region i unchanged.

In the embodiment, the region smoothing processing unit may optionally include:

a calculation subunit, configured to calculate the new control parameter according to the control parameters of the neighbouring regions according to a principle that the absolute values of the differences with the control parameters of each neighbouring region do not exceed the specified threshold value; or, specify a weight for each neighbouring region, and calculate the new control parameter according to the control parameters and weights of the neighbouring regions.

In the embodiment, the mapping relationship may optionally be any one of:

first: in the mapping relationship, a larger QP corresponds to a smaller contrast control parameter, and/or, a larger QP corresponds to a smaller definition control parameter, and/or, a larger QP corresponds to a larger noise reduction control parameter; or, or, second:

in the mapping relationship, a higher movement degree represented by a scenario type corresponds to a smaller contrast control parameter, and/or, a higher movement degree represented by a scenario type corresponds to a smaller definition control parameter, and/or, a higher movement degree represented by a scenario type corresponds to a larger noise reduction control parameter;

or, third:

in the mapping relationship, a larger luminance value corresponds to a larger contrast control parameter, and/or, a larger luminance value corresponds to a larger definition control parameter, and/or, a larger luminance value corresponds to a smaller noise reduction control parameter.

In the embodiment, the scenario type optionally at least includes a still scenario and a moving scenario;

the still scenario includes: a desktop or document sharing scenario and/or a still person scenario; and the moving scenario includes: at least one of a slight moving scenario, an ordinary moving scenario, a large moving scenario and a strenuous moving scenario.

In the embodiment, the method may optionally further include:

a coding module, configured to code the video subjected to video enhancement operation; and a sending module, configured to send the coded video.

In the embodiment, the device may optionally further include:

a receiving module, configured to receive the video;

a decoding module, configured to decode the video received by the receiving module; and the acquisition module is configured to sequentially acquire each frame in the video decoded by the decoding module.

The device provided by the embodiment may execute the method provided by any one of the abovementioned method embodiments, and detailed processes refer to descriptions in the method embodiments, and will not be elaborated herein.

According to the device provided by the embodiment, each frame in the video is sequentially acquired; for each current frame, the attribute information reflecting the moving state or the luminance is determined, the preset mapping relationship is searched to obtain the control parameter corresponding to the attribute information, and video enhancement operation is executed on the current frame by using the control parameter; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 25:
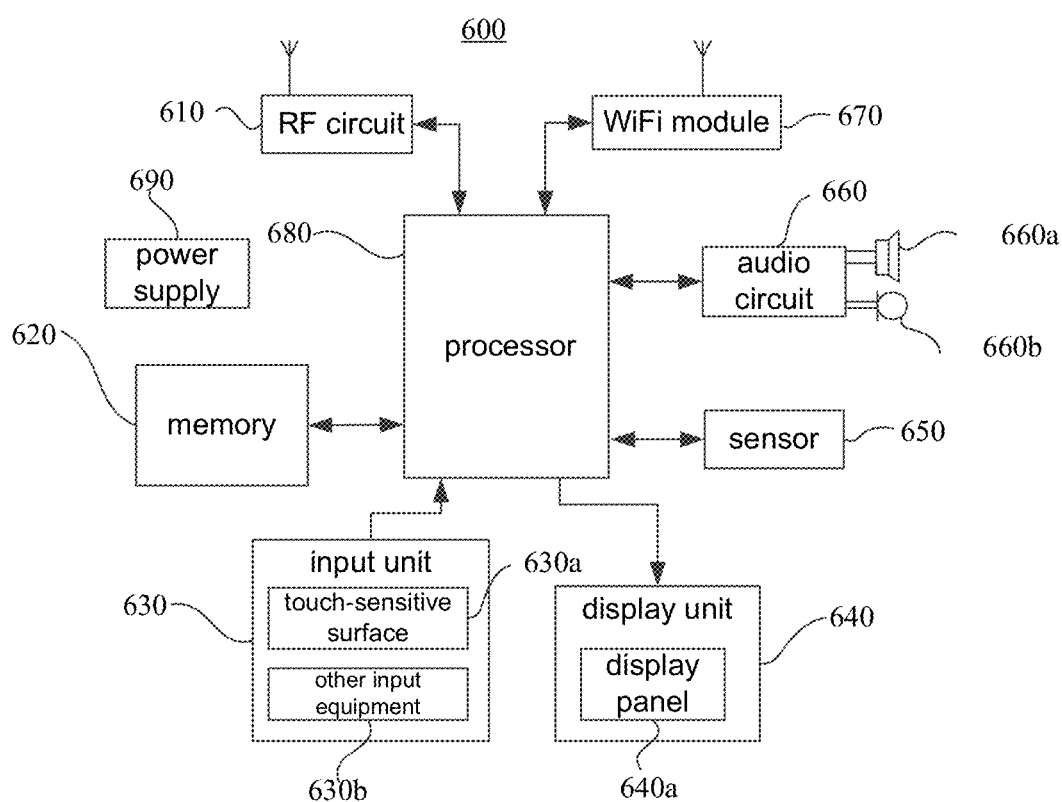
FIG. 25 is a structure diagram of a terminal according to another embodiment of the disclosure.

Referring to FIG. 25, another embodiment of the disclosure provides a terminal 600, which may include parts such as a communication unit 610, a memory 620 including one or more than one non-volatile readable storage medium, an input unit 630, a display unit 640, a sensor 650, an audio circuit 660, a Wireless Fidelity (WiFi) module 670, a processor 680 including one or more than one processing core and a power supply 690.

Those skilled in the art should know that a structure of the terminal shown in FIG. 25 is not intended to limit the terminal, and may include more or fewer parts than those shown in the figure, or combinations of some parts, or different part arrangement. Wherein:

the memory 620 may be configured to store a software programs and modules, and the processor 680 runs the software programs and modules stored in the memory 620, thereby executing various function applications and data processing. The memory 620 may mainly include a program storage area and a data storage area, wherein the program storage area may store an operating system, an application program required by at least one function and the like; and the data storage area may store data created according to use of the terminal 600 and the like. In addition, the memory 620 may include a high-speed random access memory, and may further include a non-volatile memory, such as at least one magnetic disk memory, flash memory or other volatile solid-state memory. Correspondingly, the memory 620 may further include a memory controller so as to provide access of the processor 680 and the input unit 630 to the memory 620.

The processor 680 is a control centre of the terminal 600, connects each part of the whole mobile phone by virtue of various interfaces and circuits, and monitors the whole mobile phone by running or executing the software programs and/or modules stored in the memory 620, calling the data stored in the memory 620 and execute various functions and data processing of the terminal 600. Optionally, the terminal 680 may include one or more processing cores; and preferably, the processor 680 may be integrated into an application processor and a modulation and demodulation processor, wherein the application processor mainly processes an operating system, a user interface, an application program and the like, and the modulation and demodulation processor mainly processes wireless communication. It should be understood that the modulation and demodulation processor may also not be integrated in the processor 680.

An optional structure of the terminal 600 is described above with reference to FIG. 25, wherein one or more modules are stored in the memory and configured to be executed by the one or more processors, and the one or more modules may execute the method provided by the embodiment correspondingly shown in FIG. 1.

According to the terminal provided by the embodiment, each frame in a video is sequentially acquired; for each current frame, attribute information reflecting a moving state or luminance is determined, a preset mapping relationship is searched to obtain a control parameter corresponding to the attribute information, and video enhancement operation is executed on the current frame by using the control parameter; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Figure 26:
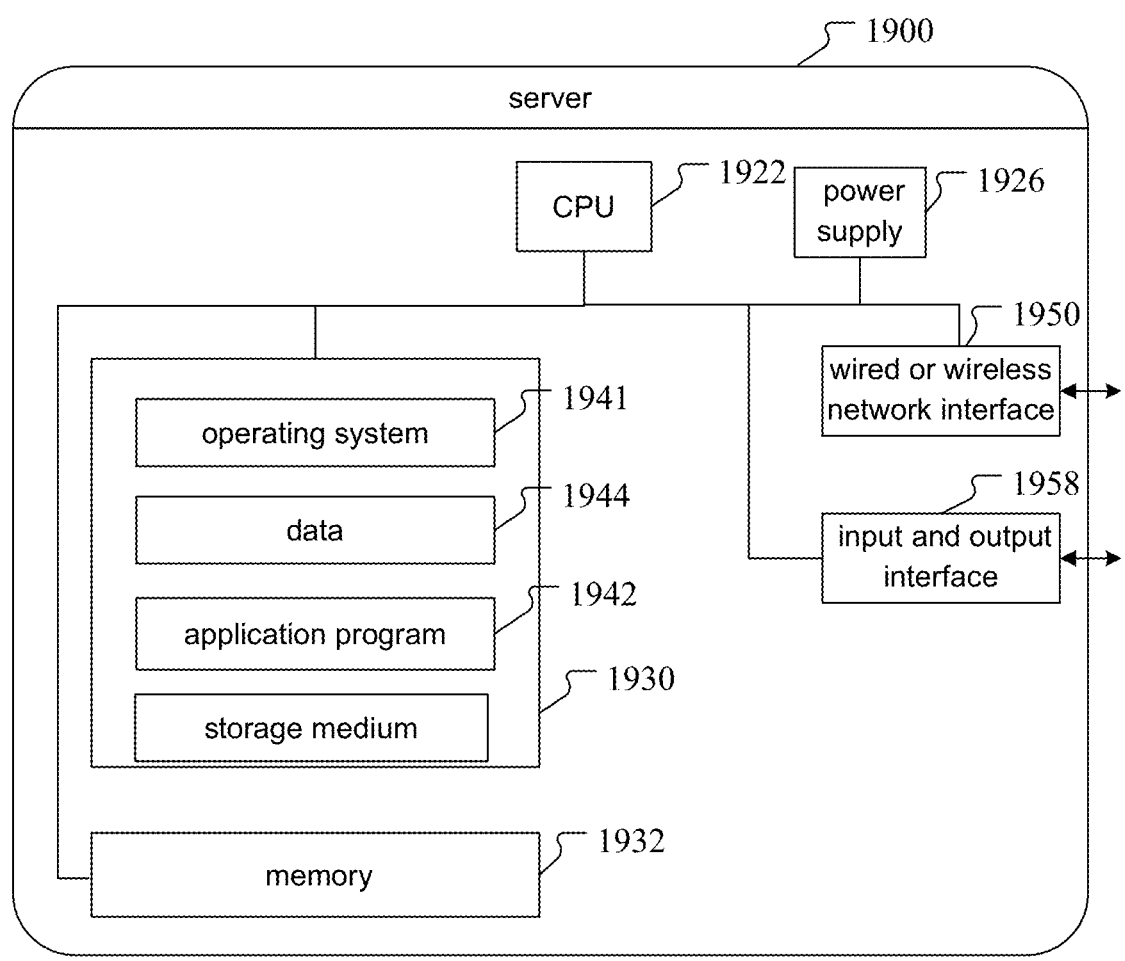
FIG. 26 is a structure diagram of a server according to another embodiment of the disclosure.

Another embodiment of the disclosure provides a server, which may be configured to execute the video enhancement methods provided by the abovementioned embodiments. Referring to FIG. 26, the server 1900 may have a great difference due to different configurations or performance, and may include one or more than one Central Processing Unit (CPU) 1922 (such as one or more than one processor) and memory 1932 and one or more than one storage medium 1930 (such as one or more than one piece of massive storage equipment) for storing application programs 1942 or data 1944. Wherein, the memory 1932 and the storage medium 1930 may be configured to temporary storage or persistent storage. The programs stored in the storage medium 1930 may include one or more than one module (not shown in the figure), and each module may include a series of instruction operation in the server. Furthermore, the CPU 1922 may be configured to communicate with the storage medium 1930 and execute a series of instruction operation in the storage medium 1930 in the server 1900.

In the embodiment, it is specifically configured that one or more than one processor executes the one or more than one program including instructions configured to execute the operation in the corresponding embodiment shown in FIG. 1.

According to the server, each frame in a video is sequentially acquired; for each current frame, attribute information reflecting a moving state or luminance is determined, a preset mapping relationship is searched to obtain a control parameter corresponding to the attribute information, and video enhancement operation is executed on the current frame by using the control parameter; the problem of processing inflexibility caused by execution of the same enhancement over each frame in the video is solved; and each frame in the video may be differentially processed, and different control parameters are determined for different enhancement according to the moving states or luminance in each frame, so that frame-based video enhancement is implemented, a video enhancement effect is effectively improved, and quality of the video is improved.

Another embodiment of the disclosure provides a non-volatile readable storage medium, in which one or more modules are stored, wherein the one or more modules may enable equipment to execute the method provided by the corresponding embodiment shown in FIG. 1 when being applied to the equipment.

The above is only the preferred embodiment of the disclosure and not intended to limit the disclosure. Any modifications, equivalent replacements, improvements and the like made within the spirit and principle of the disclosure shall fall within the scope of protection of the disclosure.

What is claimed is:

1. A video enhancement method, comprising:
   sequentially acquiring, by a video enhancement device, each frame in a video;
   for each current frame, determining, by the video enhancement device, attribute information, which reflects a moving state or luminance, of the current frame, searching a preset mapping relationship between attribute information and a control parameter to obtain a control parameter of the current frame, and executing a video enhancement operation on the current frame by using the control parameter of the current frame; or,
   for each current frame, dividing, by the video enhancement device, the current frame into multiple regions, determining attribute information, which reflects a moving state or luminance, of each region, searching a preset mapping relationship between attribute information and control parameter to obtain a control parameter of each region, and executing a video enhancement operation on the current frame by using the control parameters of all the regions in the current frame;
   wherein the attribute information comprises at least one of: a Quantization Parameter (QP), a scenario type and a luminance value;
   wherein the control parameter comprises at least one of: a contrast control parameter, a definition control parameter or a noise reduction control parameter;
   wherein a value of the control parameter may be set to be multiple levels, when the control parameter is regulated to a certain level, executing a video enhancement operation on the current frame by using the value corresponding to the certain level; or executing a video enhancement operation on the current frame by using the values corresponding to the certain level of all the regions in the current frame;
   wherein the executing video enhancement operation on the current frame by using the control parameter of the current frame comprises: calculating a difference between the control parameter of the current frame and a control parameter of a previous frame, and judging whether an absolute value of the difference exceeds a specified threshold value or not; if the absolute value of the difference exceeds the specified threshold value, calculating a new control parameter according to the control parameter of the previous frame and the threshold value, and executing a video enhancement operation on the current frame by using the new control parameter; and if the absolute value of the difference does not exceed the specified threshold value, executing a video enhancement operation on the current frame by using the control parameter of the current frame; or
   wherein before executing video enhancement operation on the current frame by using the control parameters of all the regions in the current frame, further comprising: for each region i in the current frame, judging whether an absolute value of a difference between a control parameter of a neighbouring region and a control parameter of the region i exceeds a specified threshold value or not; if an absolute value of a difference between a control parameter of at least one neighbouring region and the control parameter of the region i exceeds the specified threshold value, calculating a new control parameter according to a preset algorithm, and determining the new control parameter as the control parameter of the region i; and if the absolute values of the differences between the control parameters of all the neighbouring regions and the control parameter of the region i do not exceed the specified threshold value, keeping the control parameter of the region i unchanged.

2. The method according to claim 1, wherein the determining the attribute information, which reflects the moving state or the luminance, of the current frame and searching the preset mapping relationship between the attribute information and the control parameter to obtain the control parameter of the current frame comprises:
calculating a Quantization Parameter (QP) of the current frame, and searching a preset mapping relationship between a QP and a control parameter to obtain a control parameter corresponding to the QP; or,
determining a scenario type of the current frame, and searching a preset mapping relationship between a scenario type and a control parameter to obtain a control parameter corresponding to the scenario type; or,
calculating a luminance value of the current frame, and searching a preset mapping relationship between a luminance value and a control parameter to obtain a control parameter corresponding to the luminance value,
wherein the control parameter comprises at least one of: a contrast control parameter, a definition control parameter or a noise reduction control parameter.

3. The method according to claim 2, wherein
in the mapping relationship, a larger QP corresponds to a smaller contrast control parameter, and/or, a larger QP corresponds to a smaller definition control parameter, and/or, a larger QP corresponds to a larger noise reduction control parameter; or,
in the mapping relationship, a higher movement degree represented by a scenario type corresponds to a smaller contrast control parameter, and/or, a higher movement degree represented by a scenario type corresponds to a smaller definition control parameter, and/or, a higher movement degree represented by a scenario type corresponds to a larger noise reduction control parameter; or,
in the mapping relationship, a larger luminance value corresponds to a larger contrast control parameter, and/or, a larger luminance value corresponds to a larger definition control parameter, and/or, a larger luminance value corresponds to a smaller noise reduction control parameter.

4. The method according to claim 2, wherein
the scenario type at least comprises a still scenario and a moving scenario;
the still scenario comprises: a desktop or document sharing scenario and/or a still person scenario; and
the moving scenario comprises: at least one of a slight moving scenario, an ordinary moving scenario, a large moving scenario and a strenuous moving scenario.

5. The method according to claim 1, wherein the determining the attribute information, which reflects the moving state or the luminance, of each region and searching the preset mapping relationship between the attribute information and the control parameter to obtain the control parameter of each region comprises:
calculating a QP of each region, and searching a preset mapping relationship between a QP and a control parameter to obtain the control parameter of each region; or,
determining a scenario type of each region, and searching a preset mapping relationship between a scenario type and a control parameter to obtain the control parameter of each region; or,
calculating a luminance value of each region, and searching a preset mapping relationship between a luminance value and a control parameter to obtain the control parameter of each region.

6. The method according to claim 1, wherein calculating the new control parameter according to the preset algorithm comprises:
calculating the new control parameter according to the control parameters of the neighbouring regions, under a principle that the absolute values of the differences with the control parameters of each neighbouring region do not exceed the specified threshold value; or,
specifying a weight for each neighbouring region, and calculating the new control parameter according to the control parameters and weights of the neighbouring regions.

7. The method according to claim 1, after executing video enhancement operation on the current frame by using the control parameter, further comprising:
coding the video subjected to the video enhancement operation, and sending the coded video.

8. The method according to claim 1, wherein the sequentially acquiring each frame in the video comprises:
receiving the video, decoding the video, and sequentially acquiring each frame in the decoded video.

9. A video enhancement device, comprising: a processor and a memory, a set of program codes being stored in the memory and the processor executing the program codes stored in the memory to implement the following operation:
sequentially acquiring each frame in a video;
for each current frame, determining attribute information, which reflects a moving state or luminance, of the current frame, searching a preset mapping relationship between attribute information and a control parameter to obtain a control parameter of the current frame, and executing a video enhancement operation on the current frame by using the control parameter of the current frame; or,
for each current frame, dividing the current frame into multiple regions, determining attribute information, which reflects a moving state or luminance, of each region, searching a preset mapping relationship between the attribute information and the control parameter to obtain a control parameter of each region, and executing a video enhancement operation on the current frame by using the control parameters of all the regions in the current frame;
wherein the attribute information comprises at least one of: a Quantization Parameter (QP), a scenario type and a luminance value;
wherein the control parameter comprises at least one of: a contrast control parameter, a definition control parameter or a noise reduction control parameter;
wherein a value of the control parameter may be set to be multiple levels, when the control parameter is regulated to a certain level, executing a video enhancement operation on the current frame by using the value corresponding to the certain level; or executing a video enhancement operation on the current frame by using the values corresponding to the certain level of all the regions in the current frame;
wherein the processor executes the program codes stored in the memory to implement the following operation:

calculating a difference between the control parameter of the current frame and a control parameter of a previous frame, and judging whether an absolute value of the difference exceeds a specified threshold value or not; if the absolute value of the difference exceeds the specified threshold value, calculating a new control parameter according to the control parameter of the previous frame and the threshold value, and executing a video enhancement operation on the current frame by using the new control parameter; and if the absolute value of the difference does not exceed the specified threshold value, executing a video enhancement operation on the current frame by using the control parameter of the current frame; or wherein the processor executes the program codes stored in the memory to implement the following operation: before executing a video enhancement operation on the current frame by using the control parameters of all the regions in the current frame, for each region i in the current frame, judging whether an absolute value of a difference between a control parameter of a neighbouring region and a control parameter of the region i exceeds a specified threshold value or not; if an absolute value of a difference between a control parameter of at least one neighbouring region and the control parameter of the region i exceeds the specified threshold value, calculating a new control parameter according to a preset algorithm, and determining the new control parameter as the control parameter of the region i; and if the absolute values of the differences between the control parameters of all the neighbouring regions and the control parameter of the region i do not exceed the specified threshold value, keeping the control parameter of the region i unchanged.

10. The device according to claim 9, wherein the processor executes the program codes stored in the memory to implement the following operation:

for each current frame, calculating a Quantization Parameter (QP) of the current frame, searching a preset mapping relationship between a QP and a control parameter to obtain a control parameter corresponding to the QP, and executing a video enhancement operation on the current frame by using the control parameter; or, for each current frame, determining a scenario type of the current frame, searching a preset mapping relationship between a scenario type and a control parameter to obtain a control parameter corresponding to the scenario type, and executing a video enhancement operation on the current frame by using the control parameter; or, for each current frame, calculating a luminance value of the current frame, searching a preset mapping relationship between a luminance value and a control parameter to obtain a control parameter corresponding to the luminance value, and executing a video enhancement operation on the current frame by using the control parameter, wherein the control parameter comprises at least one of: a contrast control parameter, a definition control parameter or a noise reduction control parameter.

11. The device according to claim 10, wherein the processor executes the program codes stored in the memory to implement the following operation that:

in the mapping relationship, a larger QP corresponds to a smaller contrast control parameter, and/or, a larger QP corresponds to a smaller definition control parameter, and/or, a larger QP corresponds to a larger noise reduction control parameter; or, in the mapping relationship, a higher movement degree represented by a scenario type corresponds to a smaller contrast control parameter, and/or, a higher movement degree represented by a scenario type corresponds to a smaller definition control parameter, and/or, a scenario type representing a higher movement degree corresponds to a larger noise reduction control parameter; or, in the mapping relationship, a larger luminance value corresponds to a larger contrast control parameter, and/or, a larger luminance value corresponds to a larger definition control parameter, and/or, a larger luminance value corresponds to a smaller noise reduction control parameter.

12. The device according to claim 10, wherein the processor executes the program codes stored in the memory to implement the following operation that:

the scenario type at least comprises a still scenario and a moving scenario;

the still scenario comprises: a desktop or document sharing scenario and/or a still person scenario; and the moving scenario comprises: at least one of a slight moving scenario, an ordinary moving scenario, a large moving scenario and an strenuous moving scenario.

13. The device according to claim 9, wherein the processor executes the program codes stored in the memory to implement the following operation:

for each current frame, dividing the current frame into multiple regions, calculating QP of each region, searching the preset mapping relationship between the QP and the control parameter to obtain the control parameter of each region, and executing a video enhancement operation on the current frame by using the control parameters of all the regions in the current frame; or, for each current frame, dividing the current frame into multiple regions, determining a scenario type of each region, search the preset mapping relationship between the scenario type and the control parameter to obtain the control parameter of each region, and executing a video enhancement operation on the current frame by using the control parameters of all the regions in the current frame; or, for each current frame, dividing the current frame into multiple regions, calculating a luminance value of each region, searching the preset mapping relationship between the luminance value and the control parameter to obtain the control parameter of each region, and executing a video enhancement operation on the current frame by using the control parameters of all the regions in the current frame.

14. The device according to claim 9, wherein the processor executes the program codes stored in the memory to implement the following operation:

calculating the new control parameter according to the control parameters of the neighbouring regions, under according to a principle that the absolute values of the differences with the control parameters of each neighbouring region do not exceed the specified threshold value; or, specifying a weight for each neighbouring region, and calculating the new control parameter according to the control parameters and weights of the neighbouring regions.

15. The device according to claim 9, wherein the processor executes the program codes stored in the memory to implement the following operation:

coding the video subjected to the video enhancement operation, and sending the coded video.

16. The device according to claim 9 wherein the processor executes the program codes stored in the memory to implement the following operation:

receiving the video, decoding the video, and sequentially acquiring each frame in the decoded video.

\* \* \* \* \*